(12) United States Patent
Sotzing

(10) Patent No.: US 10,005,914 B2
(45) Date of Patent: Jun. 26, 2018

(54) HIGHLY CONDUCTIVE POLYMER FILM COMPOSITIONS FROM NANOPARTICLE INDUCED PHASE SEGREGATION OF COUNTERION TEMPLATES FROM CONDUCTING POLYMERS

(71) Applicant: THE UNIVERSITY OF CONNECTICUT, Farmington, CT (US)

(72) Inventor: Gregory Allen Sotzing, Storrs, CT (US)

(73) Assignee: THE UNIVERSITY OF CONNECTICUT, Farmington, CT (US)

(*) Notice: Subject to any disclaimer, the term of this patent is extended or adjusted under 35 U.S.C. 154(b) by 101 days.

(21) Appl. No.: 15/135,894

(22) Filed: Apr. 22, 2016

(65) Prior Publication Data

US 2016/0312044 A1    Oct. 27, 2016

Related U.S. Application Data

(60) Provisional application No. 62/151,456, filed on Apr. 23, 2015.

(51) Int. Cl.
  *H01B 1/12* (2006.01)
  *C09D 5/24* (2006.01)
  (Continued)

(52) U.S. Cl.
  CPC ............... *C09D 5/24* (2013.01); *B05D 1/005* (2013.01); *B05D 1/02* (2013.01); *B05D 1/18* (2013.01);
  (Continued)

(58) Field of Classification Search
  CPC ........ H01B 1/127; H01B 1/122; H01B 1/128; D06N 2209/041; D06N 7/00; B05D 1/005;
  (Continued)

(56) References Cited

U.S. PATENT DOCUMENTS

| 4,983,814 A | 1/1991 | Ohgushi et al. |
| 5,830,529 A | 11/1998 | Ross |

(Continued)

FOREIGN PATENT DOCUMENTS

| JP | 2008138300 A | 6/2008 |
| JP | 2008179923 A | 8/2008 |

(Continued)

OTHER PUBLICATIONS

Hair, M.L., "Hydroxyl groups on silica surface," J. Non-Crystalline Solids, 19, 1975, Abstract.*

(Continued)

*Primary Examiner* — Mark Kopec
*Assistant Examiner* — Jaison P Thomas
(74) *Attorney, Agent, or Firm* — Cantor Colburn LLP

(57) ABSTRACT

Disclosed are conductive polymer film structures comprising an insulating substrate comprising nucleophile derivatized nanoparticles located at the surface of the insulating substrate; and a conducting polymer:template polymer coating disposed on at least a portion of a surface of the insulating substrate through which a chemical bond forms between at least one anion of the template polymer and nucleophile derivatized nanoparticles located at the surface of the insulating substrate.

20 Claims, 2 Drawing Sheets

(51) Int. Cl.
  *B05D 1/00* (2006.01)
  *B05D 1/02* (2006.01)
  *B05D 1/18* (2006.01)
  *B05D 1/30* (2006.01)
  *B05D 3/14* (2006.01)

(52) U.S. Cl.
  CPC .............. *B05D 1/30* (2013.01); *B05D 3/142* (2013.01); *H01B 1/122* (2013.01); *H01B 1/127* (2013.01); *H01B 1/128* (2013.01)

(58) Field of Classification Search
  CPC ... B05D 1/02; B05D 1/18; B05D 1/30; B05D 3/142; C09D 5/24; D06M 11/45; D06M 11/46; D06M 11/73; D06M 11/79; D06M 15/19; D06M 23/08; H01Q 1/273; H01Q 1/368; H01Q 1/38
  See application file for complete search history.

(56) References Cited

U.S. PATENT DOCUMENTS

| | | |
|---|---|---|
| 6,072,619 A | 6/2000 | Kiryuschev et al. |
| 6,103,640 A | 8/2000 | Yoshikawa et al. |
| 6,184,280 B1 | 2/2001 | Shibuta |
| 6,919,105 B2 | 7/2005 | Xue et al. |
| 7,321,012 B2 | 1/2008 | Sotzing |
| 7,413,802 B2 | 8/2008 | Karayianni et al. |
| 7,455,935 B2 | 11/2008 | Abe et al. |
| 7,740,656 B2 | 6/2010 | Mensah et al. |
| 8,107,153 B2 | 1/2012 | Sotzing et al. |
| 8,178,629 B2 | 5/2012 | Sotzing et al. |
| 9,644,313 B2 | 5/2017 | Sotzing |
| 2001/0045547 A1 | 11/2001 | Senecal et al. |
| 2005/0137542 A1 | 6/2005 | Underhill et al. |
| 2005/0237594 A1 | 10/2005 | Ho et al. |
| 2005/0255139 A1 | 11/2005 | Hurd et al. |
| 2006/0112599 A1 | 6/2006 | Braynock et al. |
| 2006/0159907 A1 | 7/2006 | Percec et al. |
| 2006/0263553 A1 | 11/2006 | Yamada et al. |
| 2006/0281382 A1 | 12/2006 | Karayianni et al. |
| 2007/0042179 A1 | 2/2007 | Karayianni et al. |
| 2007/0054577 A1 | 3/2007 | Avloni |
| 2007/0065586 A1 | 3/2007 | Tao et al. |
| 2007/0078324 A1 | 4/2007 | Wijisiriwardana |
| 2007/0089845 A1 | 4/2007 | Sotzing et al. |
| 2007/0100666 A1 | 5/2007 | Stivoric et al. |
| 2007/0215232 A1 | 9/2007 | Hassonjee et al. |
| 2007/0222909 A1 | 9/2007 | Slikkerveer et al. |
| 2008/0058633 A1 | 3/2008 | Boyden et al. |
| 2008/0170982 A1 | 7/2008 | Zhang et al. |
| 2008/0318002 A1 | 12/2008 | Burr et al. |
| 2009/0005748 A1 | 1/2009 | Ales et al. |
| 2010/0028559 A1 | 2/2010 | Yan et al. |
| 2010/0163283 A1 | 7/2010 | Hamedi et al. |
| 2010/0245971 A1 | 9/2010 | Sotzing et al. |
| 2010/0294335 A1 | 11/2010 | Huang et al. |
| 2011/0027869 A1 | 2/2011 | Hatton et al. |
| 2011/0168951 A1 | 7/2011 | Sotzing |
| 2011/0304964 A1 | 12/2011 | Fleischer et al. |
| 2011/0315204 A1 | 12/2011 | Gleason et al. |
| 2011/0317240 A1 | 12/2011 | Sotzing et al. |
| 2012/0153236 A1 | 6/2012 | Cakmak et al. |
| 2012/0164429 A1 | 6/2012 | Shah et al. |
| 2012/0224247 A1 | 9/2012 | Sotzing et al. |
| 2012/0274816 A1 | 11/2012 | Scribner et al. |
| 2014/0011004 A1 | 1/2014 | Sotzing et al. |
| 2015/0017421 A1 | 1/2015 | Sotzing |
| 2016/0258110 A1 | 9/2016 | Alamer |
| 2016/0315380 A1 | 10/2016 | Sotzing |
| 2017/0018326 A1 | 1/2017 | Sotzing et al. |

FOREIGN PATENT DOCUMENTS

| | | |
|---|---|---|
| WO | 0057238 A1 | 9/2000 |
| WO | 2006051380 A1 | 5/2006 |
| WO | 2006051384 A1 | 5/2006 |
| WO | 2007008977 A1 | 1/2007 |
| WO | 2007008978 A2 | 1/2007 |
| WO | 2007099889 A1 | 7/2007 |
| WO | 2008066458 A1 | 6/2008 |
| WO | 2008098136 A1 | 8/2008 |
| WO | 2009025849 A1 | 2/2009 |
| WO | 2010022353 A1 | 2/2010 |
| WO | 2010114718 A1 | 10/2010 |
| WO | 20100141743 A1 | 12/2010 |

OTHER PUBLICATIONS

"All Organic Electrochromic Spandex", Department of Chemistry and the Polymer Program, University of Connecticut, Storrs, Connecticut, USA, pp. 296-300, including supplemental and supporting information; 2010 American Chemical Society; vol. 2, No. 1.
"Electrochemical Study of Dual Conjugated Polymer Electrochromic Devices", Journal of Electroanalytical Chemistry (2007), 609(2), 75-84.
"High Contrast Solid-State Electrochromic Devices from Substituted 3, 4-Propylenedloxythiophenes Using the Dual Conjugated Polymer Approach", Synthetic Metals (2007), 157(6-7), 261-268.
"Maximum Contrast from an Electrochromic Material", Electrochemistry Communications (2007), 9(8), 1931-1935.
"Optimization, Preparation, and Electrical Short Evaluation for 30 cm2 Active Area Dual Conjugated Polymer Electrochromic Windows", Organic Electronics (2007), 8(4), 367-381.
"Rapid Switching Solid State Electrochromic Devices Based on Complementary Conducting Polymer Films", Polymer Films (Weinheim, Germany) (1996), 8(10), 808-811.
"The Effects of Colored Base Fabric on Electrochromic Textile", University of Connecticut, Department of Chemistry and the Polymer Program, Storrs, Connecticut, USA, pp. 1-16, Jan. 4, 2010.
"Unique Variable-Gap Polyheterocycies for High-Contrast Dual Polymer Electrochromic Devices", Synthetic Metals (1997), 85(1-3), 1295-1298.
!Coating Guide Clevios TM P Formulations. 1-12 (2012) http://www.heraeus-clevios.com/media/webmedia_local/media/datenblaetter/Clevios_P_coating_guide_08-03-18jb2, pdf.
D. Alemu, H.-Y. Wel, K.-C. Ho, C.-W. Chu, Energy Environ. Sci. 2012, 5, 9662.
R. K. Hiremath, M. K. Rabinal, B. G, Mullmani, Rev. Sci. Instrum. 2006, 77, 126106.
"Preparation of conductive graphene/graphite Infused fabrics using an interface trapping method" Steven J Woltornist et al. , Carbon, vol. 81, 38-42 (2015) available online Sep. 19, 2014.
Adiprene Duracast E900, Chemtura Technical Information, Oct. 20, 2008, 4 pages.
Aleshin, A., Kiebooms, R., Merlon, R. & Heeger, A. J. Electronic transport in doped poly (3,4-ethylenedioxythlophene) near the metal-insulator transition. Synth. Met. 90, 61-68 (1997).
ChemFiles, Enabling Technologies, Ionic Liquids, vol. 5 No. 6 (2005) 24 pages.
Ding, "Conductivity trends of PRDOT-PSS Impregnated fabric and the effect of conductivity on electrochromic textile", UCONN, Department of Chemistry and the Polymer Program pp. 1-20.
Duracure C3, Chemtura Technical Information, Sep. 8, 2008, 6 pages.
Electrically controlled colour-changing textiles using the resistive heating properties of PEDOT nanofibers Laforgue, A. 2010 Journal of Materials Chemistry 20 (38) , pp. 8233-8235.
European Search Report for Application No. PCT/US2012023282 dated Jan. 5, 2015, 11 pages.
Fahad (2013) Thesis Ch. 6-7, pp. 129-182.
Fuest, Polyurethane Elastomers, Rubber Technology, 2001, 24 pages.
Groenendaal, B. L., Jonas, F., Freitag, D., Pielartzik, H. & Reynolds, J. R. Its Derivatives☐; Past , Present , and Future **. Adv. Mater, 12, 481-494 (2000).
International Search Report for Application No. PCT/US2010/027956, dated Jun. 7, 2010, 7 pages.

(56) References Cited

OTHER PUBLICATIONS

International Search Report for Application No. PCT/US2014/044529, International Filing date Jun. 27, 2014, dated Nov. 6, 2014, 5 pages.
International Search Report for international Application No. PCT/US2012/023282, International Application Filing Date Jan. 31, 2012, dated Aug 30, 2012, 3 pages.
Kim, N. et al, Highly conductive PEDOT:PSS nanofibrils Induced by solution-processed crystallization. Adv. Mater. 26, 2268-72, 2109 (2014).
Lee (2013) Flexible graphene woven fabrics for touch sensing. Applied Physics Letters, 102 (16), 163117; 5 pages.
Li et al,, "Synthesis and characterization of mixing sof-segmented waterborne polyurethane polymer electrolyte with room temperature ionic liquid", Chlnese Chemical Letters 20, 2009, pp. 519-522.
Lomax, "Breathable polyurethane membranes for textile and related industries", J. Mater. Chem. 17, 2007, pp. 2775-2784.
Materials Research Society, 2011 Spring Meeting, Online Abstract Feb. 1, 2011, 1 page.
McCulloch, I, et al, Liquid-crystalline semiconducting polymers with high charge-carrier mobility. Nat. Mater. 5, 328-33 (2006).
Mengistie, D. A., Ibrahem, M. A., Wang, P.-C, & Chu, C.-W, Highly Conductive PEDOT:PSS Treated with Formic Acid for ITO-Free Polymer Solar Cells. ACS Appl. Mater. Interfaces 6, 2292-2299 (2014).
Molina (2013) Electrochemical characterization of reduced graphene oxide-coated polyester fabrics, Electrochlmica Acta, 93, pp. 44-52.
Nardes, A. M., Janssen, R. a, J. & Kemerink, M. A Morphological Model for the Solvent-Enhanced Conductivity of PEDOT:PSS Thin Films, Adv, Funct. Mater. 18, 865-871 (2008).
Negru (2012) Electrical conductivity of woven fabrics coated with carbon black particles. Fibers and Textiles, 20(1(90)), pp. 53-56.
Okuzaki, WIPO Publication No. WO2007099889A1_Abstract of published PCT Application No. PCT/JP2007/053467 filed on Feb. 26, 2007 and published on Sep. 7, 2007, 1 page.
Ouyang, J. et al. On the mechanism of conductivity enhancement in poly(3,4-ethylenedioxythlophene):poly(styrene sulfonate) film through solvent treatment. Polymer (Guildf). 45, 8443-8450 (2004).
Reynolds, (1996) Controlled gap polymers for high contrast electrochromic devices. Polymeric Materials Science and Engineering, 75 pp. 414-415.
Rowley et al., "New Electrochromic Materials", Science Progress (2002), 85 (3), 243-262.
Rymarczyk et al,, "A novel ternary polymer electrolyte for LMP batteries based on thermal cross-linked poly (urethane acrylate) in presence of a lithium salt and an Ionic liquid", European Polymer Journal 44, 2008, pp. 2153-2161.
Santhosh et al., "Preparation and properties of new cross-linked polyurethane acrylate elctrolytes for lithium batteries", Journal of Power Sources 160, 2006, pp. 609-620.

Seiko Epson Corp, JP2008179923, Abstract, Aug 7, 2008, 2 pages.
Seok-Joo Wang (2012): Effect of Silica Nanoparticle Content on the Structure and Electrostatic Bonding of PEDOT: PSS, Molecular Crystals and Liquid Crystals, 568:1, 179-185.
Shateri-Khalilabad (2013) Fabricating eiectroconductive cotton textiles using graphene. Carbohydrate polymers, 96(1), 190-5, 6 pages.
Skotheim et al., "Handbook of Conducting Polymers", 3rd Ed., 2007, 67 pages.
Written Opinion for Application No. PCT/US2015/044529, International filing date Jun. 27, 2014, dated Nov. 6, 2014, 7 pages.
Written Opinion for International Application No. PCT/US2012/023282, International Application filing date Jan. 31, 2012, dated Aug. 30, 2012, 5 pages.
Written Opinion of International Search Report for PCT/US2010/027956, dated Jun. 7, 2010, 7 pages.
Crispin et al., "Conductivity, Morphology, Interfacial Chemistry, and Stability of Poly(3,4-ethylene dioxythiophene)-Poly(styrene sulfonate): A Photoelectron Spectroscopy Study", Journ. of Polym. Sci. Part B: Polymer Physics, vol. 41, No. 21, Nov. 11, 2003.
International Search Report; International Application No. PCT/US2016/028248; International Filing Date Apr. 19, 2016; dated Jun. 21, 2016; 6 pages.
International Search Report; International Application No. PCT/US2016/028815; International Filing Date Apr. 22, 2016; dated Jul. 14, 2016; 6 pages.
Suh et al., Effect of Fabric Substrate and Coating Material on the Quality of Conductive Printing, The Journal of the Textile Institute, 2013, vol. 104, No. 2, 213-222.
Wang et al., Effect of Silica Nanoparticle Content on the Structure and Electrostatic Bonding of PEDOT:PSS, Mol. Cryst. Liq. Cryst., vol. 568: pp. 179-185, 2012.
Written Opinion of the International Searching Authority; International Application No. PCT/US2016/028248; International Filing Date Apr. 19, 2016; 7 pages.
Written Opinion of the International Searching Authority; International Application No. PCT/US2016/028815; International Filing Date Apr. 22, 2016; 6 pages.
Xia, Y. & Ouyang, J. PEDOT:PSS films with significantly enhanced conductivities induced by preferential solvation with cosolvents and their application in polymer photovoltaic cells. J. Mater. Chem 21, 4927-4936 (2011).
Xia, Y. & Ouyang, J. Significant Conductivity Enhancement of Conductive Poly(3,4-ethylenedioxythiophene): Poly(styrenesulfonate) Films through a Treatment with Organic Carboxylic Acids and Inorganic Acids. ACS Appl. Mater. Interfaces 2, 474-483 (2010).
Yamashita (2013) Fabrication and evaluation of a conductive polymer coated ealstomer contact structure for woven electronic textile. Sensors and Actuators A: Physical, 195, pp. 213-218.
International Preliminary Report on Patentability for International Application No. PCT/US2016/028248, International Filing Date Apr. 19, 2016, dated Nov. 2, 2017, 7 pages.

* cited by examiner

HIGHLY CONDUCTIVE POLYMER FILM COMPOSITIONS FROM NANOPARTICLE INDUCED PHASE SEGREGATION OF COUNTERION TEMPLATES FROM CONDUCTING POLYMERS

CROSS-REFERENCE TO RELATED APPLICATIONS

This application claims the benefit of U.S. Provisional Application Ser. No. 62/151,456, filed Apr. 23, 2015, which is incorporated herein by reference in its entirety.

BACKGROUND

Optically transparent conductors have been utilized in industry mainly for displays for televisions, electronic hand-held information device (e.g. Personal Digital Assistant or "PDA"), computers, iPods, smart phones, cellular phones, etc. Indium Tin Oxide (ITO) is the current standard with ITO coated on glass having a sheet resistance of approximately 5 to 8 ohm/sq. ITO on plastic for flexible devices is problematic, having a much higher sheet resistance of 50 ohm/sq. Many global industries have been looking for replacements, with poly(3,4-ethylenedioxythiophene)-poly (styrenesulfonate) (PEDOT-PSS) being one potential. One approach to get high conductivity and low sheet resistance PEDOT requires sulfuric acid washing to remove the PSS template. This is an additional step to the process, and the resulting sheet resistances are not low enough to be competitive, having electrical conductivities of approximately 4500 S/cm with sheet resistances of 50 ohm/sq.

Other technologies include the use of carbon nanotubes, graphene, silver nanowires, etc. Each of these has its own problems. For carbon nanotubes it is the expense and supply of the carbon nanotubes, as well as lack of batch to batch consistency. For graphene, the problem has been processing to generate single to double layer films to achieve the transparency on bulk substrates. Silver nanowires have been most promising, but silver has a very low oxidation potential.

Thus, there remains a need in the art for new materials that can function as ITO replacements and that can be manufactured simply to result in films of high conductivity, low sheet resistance, and high transparency.

BRIEF SUMMARY

In one embodiment, a conductive polymer film structure comprises an insulating substrate comprising nucleophile derivatized nanoparticles located at the surface of the insulating substrate; and a conducting polymer:template polymer coating disposed on at least a portion of a surface of the insulating substrate through which a chemical bond forms between at least one anion of the template polymer and nucleophile derivatized nanoparticles located at the surface of the insulating substrate.

In another embodiment, a method of making a conductive polymer film structure comprises forming a conducting polymer:template polymer coating on at least a portion of a surface of an insulating substrate, wherein the insulating substrate comprises nanoparticles located at the surface of the insulating substrate, optionally where the insulating substrate is plasma treated before the forming a conducting polymer:template polymer coating.

Also disclosed are articles that comprise the conductive polymer film structure.

DETAILED DESCRIPTION

Disclosed herein are conductive polymer film structures, and more specifically transparent conductive polymer film structures comprising a film of conducting polymer:template polymer material disposed on a surface of a substrate, wherein the substrate comprises surface nanoparticles. The film of conducting polymer:template polymer material is phase separated such that there is a higher concentration of template polymer at the interface of the surface of the substrate and the film of conducting polymer:template polymer material. Not wishing to be bound by theory, it is proposed that a small amount of 'leaving group' or 'nucleophile' derivatized nanoparticle present at the surface of the substrate reacts with the template polymer, e.g. polystyrenesulfonic acid, polyvinylphoshoric acid, etc. used as a counterion for the conducting polymer, to form covalent bonds at the particle surface that induce a phase segregation of the template polymer from the conducting polymer. This phase segregation generates a gradient of ratios of Template Polymer:Conducting Polymer, with the highest amount of Template Polymer:Conducting polymer occurring at the interface of the substrate and the Template Polymer:Conducting polymer film. Thus, there is a gradient by which most of the conducting polymer is at the surface of the film of conducting polymer:template polymer material, and away from the substrate surface.

Figure 1:
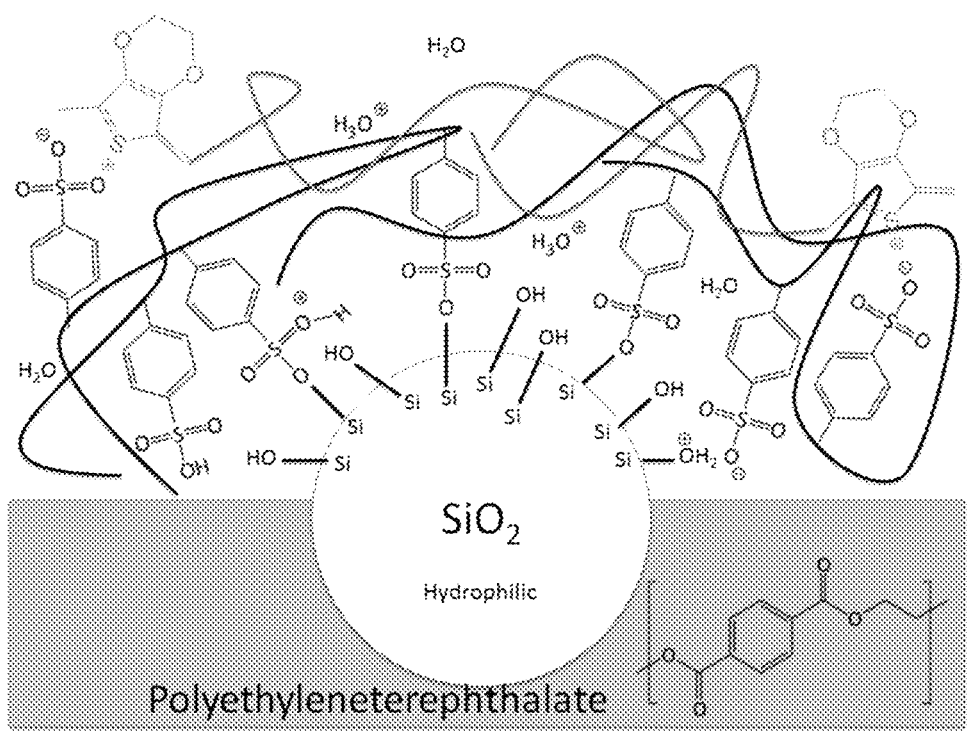
FIG. 1 is a schematic of the proposed phase segregation of PEDOT:PSS based on chemical reaction of the PSS with silica nanoparticles at the surface of a PET substrate.

FIG. 1 depicts the proposed phase segregation of PEDOT:PSS and is not to scale. The substrate is polyethyleneterephthalate (PET) comprising particles of silica at the surface (a single $SiO_2$ nanoparticle is shown). The PSS reacts with the Si—OH groups of the silica to form covalent bonds, thus resulting in a higher concentration of PSS at the interface of the PET substrate and PEDOT:PSS film and a higher concentration of PEDOT furthest from this interface. Not wishing to be bound by theory, but it is possible that the phase segregation occurs as the nucleophile derivatized nanoparticle is in a solid phase and the template polymer is in solution; and it is surprising that such a chemical reaction would take place and induce a phase separation phenomenon.

The conductive polymer film structure comprises an insulating substrate comprising nanoparticles located at the surface of the insulating substrate; and a conducting polymer:template polymer coating disposed on a surface of the insulating substrate, wherein the conducting polymer:template polymer coating is a film/sheet disposed on a substantial portion of the surface of the insulating substrate, or in an alternative embodiment, the conducting polymer:template polymer coating is in the form of a pattern on at least a portion of the surface of the insulating substrate.

The substrate comprising nucleophile derivatized nanoparticles at the substrate surface is prepared from a polymeric material, specifically an insulating polymer material such as a thermoplastic, an elastomer, and the like. An advantage of employing a polymeric substrate is that it can be flexed and bent. When the substrate is an elastomer material, the film would have the ability to both flex/bend and stretch. The term "substrate comprising nucleophile derivatized nanoparticles at the substrate surface" is synonymous with the term "substrate comprising surface nucleophile derivatized nanoparticles". Further as used herein, the term "surface nucleophile derivatized nanoparticles" is synonymous with "surface nanoparticles".

Suitable insulating polymers include polyacrylic, polyamide, polycarbonate, polyether, polyester (e.g. polyethyleneterephthalate), polyethylene, polyimide, polyurethane, polyester-polyurethane copolymer, polyurea, polythiourea, polysiloxane, polyisoprene, polybutadiene, polyethylene oxide, polylactic acid blends thereof, copolymers thereof such as polyester-polyurethane copolymer (e.g. Spandex), and the like.

The nucleophile derivatized nanoparticles can be nanoparticulate inorganic oxide such as silicon dioxide ($SiO_2$), titanium dioxide ($TiO_2$), aluminum oxide, calcium oxide, amine functionalized nanoparticles, or a combination thereof. The nucleophile derivatized nanoparticles can have an average particle size of about 1 nanometer (nm) to about 1000 nm, specifically about 5 nm to about 500 nm, and more specifically about 10 nm to about 200 nm. In an embodiment, the nucleophile derivatized nanoparticles have an average particle size measured by transmission electron microscopy of about 10 nm, with a distribution of about 8 to about 12 nm.

The nucleophile derivatized nanoparticles can be present in an amount of about 0.01 to about 6.0 wt % by weight of the polymer substrate comprising nucleophile derivatized nanoparticles, specifically about 0.05 to about 5.0 wt %, and more specifically about 0.1 to about 4.0 wt % by weight of the polymer substrate comprising nucleophile derivatized nanoparticles.

The substrate comprising surface nucleophile derivatized nanoparticles can be of any thickness. For those applications that require film flexibility, stretchability, and/or transparency, the thickness of the substrate comprising surface nucleophile derivatized nanoparticles can be about 100 nm to about 1 centimeter (cm), specifically about 500 nm to about 0.1 cm, more specifically about 1 micrometer to about 5 millimeter (mm). In an embodiment, a flexible substrate can have a thickness of about 1 micrometer to about 5 mm.

The substrate comprising surface nucleophile derivatized nanoparticles can be a uniform sheet, which can have a flat surface, a curvature, or a corrugated surface. Within this embodiment, the substrate comprising nanoparticles is not a woven, knit, or unwoven fabric and is not a fiber.

The nucleophile derivatized nanoparticles can be present at the substrate surface in a random pattern or an organize pattern or design. The nucleophile derivatized nanoparticles are present at least embedded at the surface of the substrate where at least a portion of the nanoparticle is exposed, and optionally further distributed within the substrate material itself.

The substrate comprising nucleophile derivatized nanoparticles at the substrate surface can further be disposed on an additional substrate free of nanoparticles such as an insulating polymer material, glass, a combination thereof, and the like. The surface of the additional substrate can be flat or have curvature.

Nucleophile derivatized nanoparticles are incorporated into the substrate such that the nanoparticles are exposed to the surface. Treatment, such as plasma treatment, can further expose the nanoparticles as well as generate a more polar polymer surface. Plasma treatment can be conducted using processes and process conditions well known in the art. The nucleophile derivatized nanoparticle serves as nucleation sites and allow growth or have segregation better achieved by polarity induced on polymer due to plasma treatment.

In an embodiment, the substrate comprising the nucleophile derivatized nanoparticles is transparent, having transparencies of greater than 65%, specifically about 87 to about 99%, and more specifically 90 to about 99%, measured as the photopic transmission across the entire visible light range, wavelength of 350 to 800 nm.

To form the substrate comprising surface nucleophile derivatized nanoparticles, the nanoparticles can be incorporated into a substrate material any number of ways. In one embodiment, the substrate material is combined with nanoparticles at or slightly above the melt temperature of the substrate material and blended with high shear to ensure no clustering of the nanoparticles. The resulting melt can be processed via conventional melt processing and/or extrusion techniques known in the art.

In another embodiment, a thin film of the substrate material comprising the nucleophile derivatized nanoparticles can be applied or cast onto another substrate free of nucleophile derivatized nanoparticles. The casting process can be carried out by dissolving the substrate material in a suitable solvent containing the nanoparticles and casting this solution onto the surface of another substrate free of nanoparticles, also referred to herein as an additional substrate. Alternatively, a solution of substrate material in a suitable solvent can be prepared and a separate suspension or solution of nanoparticles in a suitable solvent is prepared and the first solution is combined with the second suspension/solution with mixing to form a casting liquid. The casting liquid is then cast onto a substrate free of nanoparticles followed by removal of the solvent. The substrate free of nucleophile derivatized nanoparticles can be a polymeric material, glass, a reflective material, or the like, or a combination thereof.

Suitable solvents for forming a cast film of substrate material comprising the nanoparticles depend upon the substrate material. The solvent can be an organic solvent or combination of an organic solvent and water, specifically deionized water. Exemplary organic solvents include dichloromethane (DCM), toluene, N,N-dimethyl formamide (DMF), propylene glycol monomethyl ether acetate (PGMEA), propylene glycol monomethyl ether (PGME), acetone, methanol, ethanol, tetrahydrofuran (THF), dimethylacetamide (DMAC), ethyl acetate and trifluoroacetic acid.

In another embodiment, the nanoparticles can be applied to a substrate via a deposition technique. For example, silica nanoparticles having exposed hydroxyl functionality could be 'blown' onto a PET substrate, and then the nanoparticles could undergo a transesterification with the PET that would covalently link the silica particles and anchor them to the PET substrate surface.

The conducting polymer film structure comprises a conducting polymer:template polymer film disposed on the substrate comprising surface nucleophile derivatized nanoparticles.

A conducting polymer:template polymer film can be formed on the substrate comprising surface nanoparticles using any variety of techniques known in the art. For example, a PEDOT-PSS film can be applied using solution processing from the bulk supplied material followed by annealing. Other suitable processes include tape casting, flow coating, spray coating, etc. The annealing can be conducted at temperatures of about 80 to about 130° C., specifically about 90 to about 125° C., and yet more specifically about 100 to about 120° C. for as long as needed. Such conditions can be carried out in an oven or other suitable apparatus with or without vacuum or air flow.

Conducting polymers are known in the art and are often complexed with a template polymer, e.g. polystyrenesulfonic acid, polyvinylphoshoric acid, etc. where the sulfate or phosphonate, etc. serve as the counterion for the conducting polymer that possess positive charges as the charge carrier.

Conducting polymers include those conducting polymers comprising units of conducting monomers, e.g. where the conducting polymer is prepared by template polymerization. Examples of suitable conducting monomers include those known in the art to exhibit electroactivity when polymerized, including but not limited to thiophene, substituted thiophene, 3,4-ethylenedioxythiophene, thieno[3,4-b]thiophene, substituted thieno[3,4-b]thiophene, dithieno[3,4-b:3', 4'-d]thiophene, thieno[3,4-b]furan, substituted thieno[3,4-b]furan, bithiophene, substituted bithiophene, pyrrole, substituted pyrrole, phenylene, substituted phenylene, naphthalene, substituted naphthalene, biphenyl and terphenyl and their substituted versions, phenylene vinylene, substituted phenylene vinylene, aniline, substituted aniline, the monomers disclosed herein as structures (I)-(XXIX), combinations thereof, and the like.

Suitable conducting monomers include 3,4-ethylenedioxythiophene, 3,4-ethylenedithiathiophene, 3,4-ethylenedioxypyrrole, 3,4-ethylenedithiapyrrole, 3,4-ethylenedioxyfuran, 3,4-ethylenedithiafuran, and derivatives having the general structure (I):

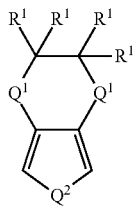

(I)

wherein each occurrence of $Q^1$ is independently S or O; $Q^2$ is S, O, or N—$R^2$ wherein $R^2$ is hydrogen or $C_1$-$C_6$ alkyl; and each occurrence of $R^1$ is independently hydrogen, $C_1$-$C_{12}$ alkyl, $C_1$-$C_{12}$ alkyl-OH, $C_1$-$C_{12}$ haloalkyl, $C_1$-$C_{12}$ alkoxy, $C_1$-$C_{12}$ haloalkoxy, aryl, —$C_1$-$C_6$ alkyl-O—$C_1$-$C_6$ alkyl, or —$C_1$-$C_6$ alkyl-O-aryl. In one embodiment, each occurrence of $R^1$ is hydrogen. In one embodiment, each $Q^1$ is O and $Q^2$ is S. In another embodiment, each $Q^1$ is O, $Q^2$ is S, and one $R^1$ is $C_1$-$C_{12}$ alkyl, $C_1$-$C_{12}$ alkyl-OH, $C_1$-$C_{12}$ haloalkyl, $C_1$-$C_{12}$ alkoxy, $C_1$-$C_{12}$ haloalkoxy, —$C_1$-$C_6$ alkyl-O—$C_1$-$C_6$ alkyl, while the remaining $R^1$ are hydrogen. In another embodiment, each $Q^1$ is O, $Q^2$ is S, and one $R^1$ is $C_1$ alkyl-OH, while the remaining $R^1$ are hydrogen. A specific conducting monomer is EDOT.

Another suitable conducting monomer includes an unsubstituted and 2- or 6-substituted thieno[3,4-b]thiophene and thieno[3,4-b]furan having the general structures (II), (III), and (IV):

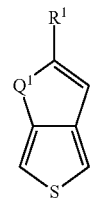

(II)

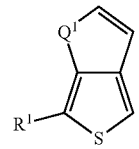

(III)

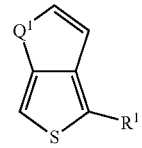

(IV)

wherein $Q^1$ is S, O, or Se; and $R^1$ is hydrogen, $C_1$-$C_{12}$ alkyl, $C_1$-$C_{12}$ haloalkyl including perfluoroalkyl, $C_1$-$C_{12}$ alkoxy, $C_1$-$C_{12}$ haloalkoxy, aryl, —$C_1$-$C_6$ alkyl-O—$C_1$-$C_6$ alkyl, or —$C_1$-$C_6$ alkyl-O-aryl. In one embodiment, $Q^1$ is S and $R^1$ is hydrogen. In another embodiment, $Q^1$ is O and $R^1$ is hydrogen. In yet another embodiment, $Q^1$ is Se and $R^1$ is hydrogen.

Another suitable conducting monomer includes substituted 3,4-propylenedioxythiophene (ProDOT) monomers according to the general structure (V):

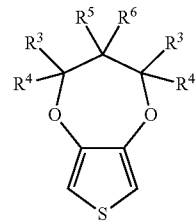

(V)

wherein each instance of $R^3$, $R^4$, $R^5$, and $R^6$ independently is hydrogen; optionally substituted $C_1$-$C_{20}$ alkyl, $C_1$-$C_{20}$ haloalkyl, aryl, $C_1$-$C_{20}$ alkoxy, $C_1$-$C_{20}$ haloalkoxy, aryloxy, $C_1$-$C_{10}$ alkyl-O—$C_1$-$C_{10}$ alkyl, —$C_1$-$C_{10}$ alkyl-O-aryl, —$C_1$-$C_{10}$ alkyl-aryl; or hydroxyl. The $C_1$-$C_{20}$ alkyl, $C_1$-$C_{20}$ haloalkyl, aryl, $C_1$-$C_{20}$ alkoxy, $C_1$-$C_{20}$ haloalkoxy, aryloxy, —$C_1$-$C_{10}$ alkyl-O—$C_1$-$C_{10}$ alkyl, —$C_1$-$C_{10}$ alkyl-O-aryl, or —$C_1$-$C_{10}$ alkyl-aryl groups each may be optionally substituted with one or more of $C_1$-$C_{20}$ alkyl; aryl; halogen; hydroxyl; —N—$(R^2)_2$ wherein each $R^2$ is independently hydrogen or $C_1$-$C_6$ alkyl; cyano; nitro; —COOH; —S(=O)$C_0$-$C_{10}$ alkyl; or —S(=O)$_2$$C_0$-$C_{10}$ alkyl. In one embodiment, $R^5$ and $R^6$ are both hydrogen. In another embodiment, $R^5$ and $R^6$ are both hydrogen, each instance of $R^3$ independently is $C_1$-$C_{10}$ alkyl or benzyl, and each instance of $R^4$ independently is hydrogen, $C_1$-$C_{10}$ alkyl, or benzyl. In another embodiment, $R^5$ and $R^6$ are both hydrogen, each instance of $R^3$ independently is $C_1$-$C_5$ alkyl or benzyl and each instance of $R^4$ independently is hydrogen, $C_1$-$C_5$ alkyl, or benzyl. In yet another embodiment, each instance of $R^3$ and $R^4$ are hydrogen, and one of $R^5$ and $R^6$ is hydroxyl while the other is hydrogen.

Other suitable conducting monomers include pyrrole, furan, thiophene, and derivatives having the general structure (VI):

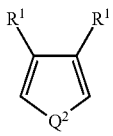

(VI)

wherein $Q^2$ is S, O, or N—$R^2$ wherein $R^2$ is hydrogen or $C_1$-$C_6$ alkyl; and each occurrence of $R^1$ is independently hydrogen, $C_1$-$C_{12}$ alkyl, $C_1$-$C_{12}$ haloalkyl, $C_1$-$C_{12}$ alkoxy, $C_1$-$C_{12}$ haloalkoxy, aryl, —$C_1$-$C_6$ alkyl-O—$C_1$-$C_6$ alkyl, or —$C_1$-$C_6$ alkyl-O-aryl.

Additional conducting monomers include isathianaphthene, pyridothiophene, pyrizinothiophene, and derivatives having the general structure (VII):

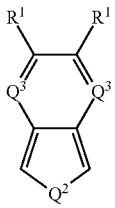

(VII)

wherein $Q^2$ is S, O, or N—$R^2$ wherein $R^2$ is hydrogen or $C_1$-$C_6$ alkyl; each occurrence of $Q^3$ is independently CH or N; and each occurrence of $R^1$ is independently hydrogen, $C_1$-$C_{12}$ alkyl, $C_1$-$C_{12}$ haloalkyl, $C_1$-$C_{12}$ alkoxy, $C_1$-$C_{12}$ haloalkoxy, aryl, —$C_1$-$C_6$ alkyl-O—$C_1$-$C_6$ alkyl, or —$C_1$-$C_6$ alkyl-O-aryl.

Still other conducting monomers include oxazole, thiazole, and derivatives having the general structure (VIII):

(VIII)

wherein $Q^1$ is S or O.

Additional conducting monomers include the class of compounds according to structure (IX):

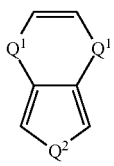

(IX)

wherein $Q^2$ is S, O, or N—$R^2$ wherein $R^2$ is hydrogen or $C_1$-$C_6$ alkyl; and each occurrence of $Q^1$ is independently S or O.

Additional conducting monomers include bithiophene, bifuran, bipyrrole, and derivatives having the following general structure (X):

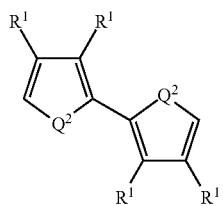

(X)

wherein each occurrence of $Q^2$ is independently S, O, or N—$R^2$ wherein $R^2$ is hydrogen or $C_1$-$C_6$ alkyl; and each occurrence of $R^1$ is independently hydrogen, $C_1$-$C_{12}$ alkyl, $C_1$-$C_{12}$ haloalkyl, $C_1$-$C_{12}$ alkoxy, $C_1$-$C_{12}$ haloalkoxy, aryl, —$C_1$-$C_6$ alkyl-O—$C_1$-$C_6$ alkyl, or —$C_1$-$C_6$ alkyl-O-aryl.

Conducting monomers include terthiophene, terfuran, terpyrrole, and derivatives having the following general structure (XI):

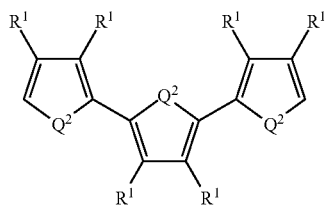

(XI)

wherein each occurrence of $Q^2$ is independently S, O, or N—$R^2$ wherein $R^2$ is hydrogen or $C_1$-$C_6$ alkyl; and each occurrence of $R^1$ is independently hydrogen, $C_1$-$C_{12}$ alkyl, $C_1$-$C_{12}$ haloalkyl, $C_1$-$C_{12}$ alkoxy, $C_1$-$C_{12}$ haloalkoxy, aryl, —$C_1$-$C_6$ alkyl-O—$C_1$-$C_6$ alkyl, or —$C_1$-$C_6$ alkyl-O-aryl.

Additional conducting monomers include thienothiophene, thienofuran, thienopyrrole, furanylpyrrole, furanylfuran, pyrolylpyrrole, and derivatives having the following general structure (XII):

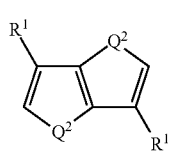

(XII)

wherein each occurrence of $Q^2$ is independently S, O, or N—$R^2$ wherein $R^2$ is hydrogen or $C_1$-$C_6$ alkyl; and each occurrence of $R^1$ is independently hydrogen, $C_1$-$C_{12}$ alkyl, $C_1$-$C_{12}$ haloalkyl, $C_1$-$C_{12}$ alkoxy, $C_1$-$C_{12}$ haloalkoxy, aryl, —$C_1$-$C_6$ alkyl-O—$C_1$-$C_6$ alkyl, or —$C_1$-$C_6$ alkyl-O-aryl.

Still other conducting monomers include dithienothiophene, difuranylthiophene, dipyrrolylthiophene, dithienofuran, dipyrrolylfuran, dipyrrolylpyrrole, and derivatives having the following general structure (XIII):

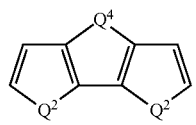

(XIII)

wherein each occurrence of $Q^2$ is independently S, O, or N—$R^2$ wherein $R^2$ is hydrogen or $C_1$-$C_6$ alkyl; $Q^4$ is $C(R^1)_2$, S, O, or N—$R^2$; and each occurrence of $R^1$ is independently hydrogen, $C_1$-$C_{12}$ alkyl, $C_1$-$C_{12}$ haloalkyl, $C_1$-$C_{12}$ alkoxy, $C_1$-$C_{12}$ haloalkoxy, aryl, —$C_1$-$C_6$ alkyl-O—$C_1$-$C_6$ alkyl, or —$C_1$-$C_6$ alkyl-O-aryl.

Additional conducting monomers include dithienylcyclopentenone, difuranylcyclopentenone, dipyrrolylcyclopentenone and derivatives having the following general structure (XIV):

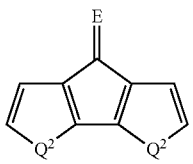

(XIV)

wherein each occurrence of $Q^2$ is independently S, O, or N—$R^2$ wherein $R^2$ is hydrogen or $C_1$-$C_6$ alkyl; and E is O or $C(R^7)_2$, wherein each occurrence of $R^7$ is an electron withdrawing group.

Other suitable conducting monomers include those having the following general structure (XV):

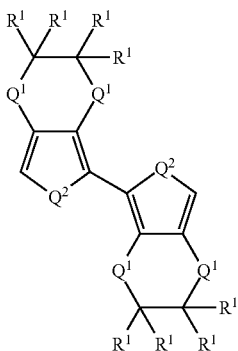

(XV)

wherein each occurrence of $Q^1$ is independently S or O; each occurrence of $Q^2$ is independently S, O, or N—$R^2$ wherein $R^2$ is hydrogen or $C_1$-$C_6$ alkyl; each occurrence of $R^1$ is independently hydrogen, $C_1$-$C_{12}$ alkyl, $C_1$-$C_{12}$ haloalkyl, $C_1$-$C_{12}$ alkoxy, $C_1$-$C_{12}$ haloalkoxy, aryl, —$C_1$-$C_6$ alkyl-O—$C_1$-$C_6$ alkyl, or —$C_1$-$C_6$ alkyl-O-aryl. In one embodiment, each occurrence of $Q^1$ is O; each occurrence of $Q^2$ is S; and each occurrence of $R^1$ is hydrogen.

Additional conducting monomers include dithienovinylene, difuranylvinylene, and dipyrrolylvinylene according to the structure (XVI):

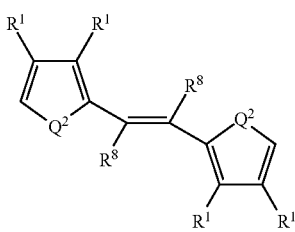

(XVI)

wherein each occurrence of $Q^2$ is independently S, O, or N—$R^2$ wherein $R^2$ is hydrogen or $C_1$-$C_6$ alkyl; each occurrence of $R^1$ is independently hydrogen, $C_1$-$C_{12}$ alkyl, $C_1$-$C_{12}$ haloalkyl, $C_1$-$C_{12}$ alkoxy, $C_1$-$C_{12}$ haloalkoxy, aryl, —$C_1$-$C_6$ alkyl-O—$C_1$-$C_6$ alkyl, or —$C_1$-$C_6$ alkyl-O-aryl; and each occurrence of $R^8$ is hydrogen, $C_1$-$C_6$ alkyl, or cyano.

Other conducting monomers include 1,2-Trans(3,4-ethylenedioxythienyl)vinylene, 1,2-trans(3,4-ethylenedioxyfuranyl)vinylene, 1,2-trans(3,4ethylenedioxypyrrolyl)vinylene, and derivatives according to the structure (XVII):

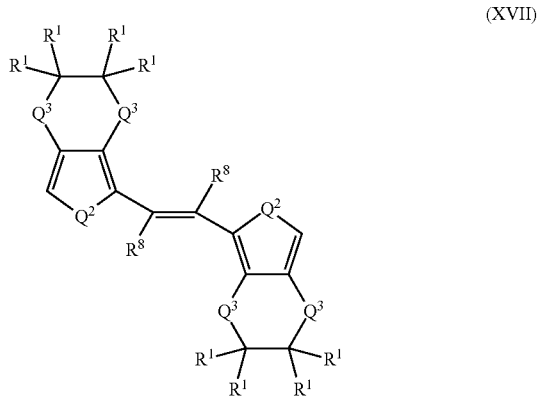

(XVII)

wherein each occurrence of $Q^3$ is independently $CH_2$, S, or O; each occurrence of $Q^2$ is independently S, O, or N—$R^2$ wherein $R^2$ is hydrogen or $C_1$-$C_6$ alkyl; each occurrence of $R^1$ is independently hydrogen, $C_1$-$C_{12}$ alkyl, $C_1$-$C_{12}$ haloalkyl, $C_1$-$C_{12}$ alkoxy, $C_1$-$C_{12}$ haloalkoxy, aryl, —$C_1$-$C_6$ alkyl-O—$C_1$-$C_6$ alkyl, or —$C_1$-$C_6$ alkyl-O-aryl; and each occurrence of $R^8$ is hydrogen, $C_1$-$C_6$ alkyl, or cyano.

Additional conducting monomers include the class bis-thienylarylenes, bis-furanylarylenes, bis-pyrrolylarylenes and derivatives according to the structure (XVIII):

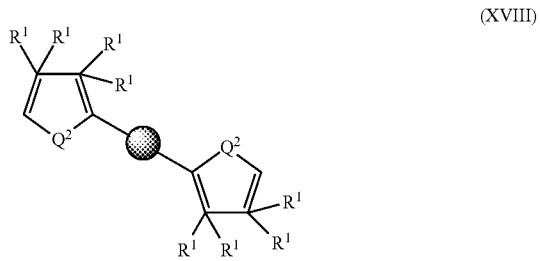

(XVIII)

wherein each occurrence of $Q^2$ is independently S, O, or N—$R^2$ wherein $R^2$ is hydrogen or $C_1$-$C_6$ alkyl; each occurrence of $R^1$ is independently hydrogen, $C_1$-$C_{12}$ alkyl, $C_1$-$C_{12}$ haloalkyl, $C_1$-$C_{12}$ alkoxy, $C_1$-$C_{12}$ haloalkoxy, aryl, —$C_1$-$C_6$ alkyl-O—$C_1$-$C_6$ alkyl, or —$C_1$-$C_6$ alkyl-O-aryl; and

represents an aryl. Exemplary aryl groups include furan, pyrrole, N-substituted pyrrole, phenyl, biphenyl, thiophene, fluorene, 9-alkyl-9H-carbazole, and the like.

Other conducting monomers include the class of bis(3,4-ethylenedioxythienyl)arylenes, related compounds, and derivatives according to the structure (XIX):

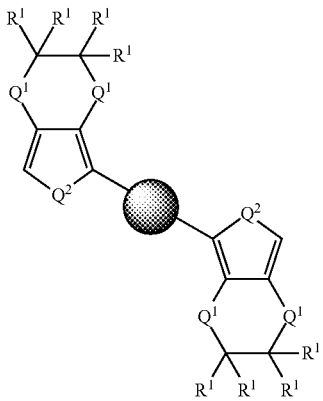
(XIX)

wherein each occurrence of $Q^1$ is independently S or O; each occurrence of $Q^2$ is independently S, O, or N—$R^2$ wherein $R^2$ is hydrogen or $C_1$-$C_6$ alkyl; each occurrence of $R^1$ is independently hydrogen, $C_1$-$C_{12}$ alkyl, $C_1$-$C_{12}$ haloalkyl, $C_1$-$C_{12}$ alkoxy, $C_1$-$C_{12}$ haloalkoxy, aryl, —$C_1$-$C_6$ alkyl-O—$C_1$-$C_6$ alkyl, or —$C_1$-$C_6$ alkyl-O-aryl; and

represents an aryl.

Other exemplary conducting monomers include bis(3,4-ethylenedioxythienyl)arylenes according to structure (XIX) includes the compound wherein all $Q^1$ are O, both $Q^2$ are S, all $R^1$ are hydrogen, and

is phenyl linked at the 1 and 4 positions. Another exemplary compound is where all $Q^1$ are O, both $Q^2$ are S, all $R^1$ are hydrogen, and

is thiophene linked at the 2 and 5 positions.

Additional conducting monomers include the class of compounds according to structure (XX):

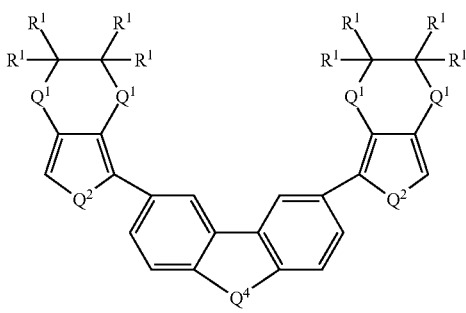
(XX)

wherein each occurrence of $Q^1$ is independently S or O; each occurrence of $Q^2$ is independently S, O, or N—$R^2$ wherein $R^2$ is hydrogen or $C_1$-$C_6$ alkyl; $Q^4$ is $C(R^1)_2$, S, O, or N—$R^2$; and each occurrence of $R^1$ is independently hydrogen, $C_1$-$C_{12}$ alkyl, $C_1$-$C_{12}$ haloalkyl, $C_1$-$C_{12}$ alkoxy, $C_1$-$C_{12}$ haloalkoxy, aryl, —$C_1$-$C_6$ alkyl-O—$C_1$-$C_6$ alkyl, or —$C_1$-$C_6$ alkyl-O-aryl. In one embodiment, each occurrence of $Q^1$ is O; each occurrence of $Q^2$ is S; each occurrence of $R^1$ is hydrogen; and $R^2$ is methyl.

Still other conducting monomers include the class of compounds according to structure (XXI):

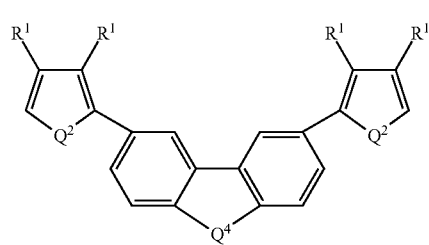
(XXI)

wherein each occurrence of $Q^2$ is independently S, O, or N—$R^2$ wherein $R^2$ is hydrogen or $C_1$-$C_6$ alkyl; $Q^4$ is $C(R^1)_2$, S, O, or N—$R^2$; and each occurrence of $R^1$ is independently hydrogen, $C_1$-$C_{12}$ alkyl, $C_1$-$C_{12}$ haloalkyl, $C_1$-$C_{12}$ alkoxy, $C_1$-$C_{12}$ haloalkoxy, aryl, —$C_1$-$C_6$ alkyl-O—$C_1$-$C_6$ alkyl, or —$C_1$-$C_6$ alkyl-O-aryl.

Additional conducting monomers include the class of compounds according to structure (XXII):

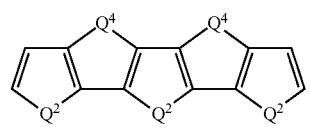
(XXII)

wherein each occurrence of $Q^2$ is independently S, O, or N—$R^2$ wherein $R^2$ is hydrogen or $C_1$-$C_6$ alkyl; each occurrence of $Q^4$ is $C(R^1)_2$, S, O, or N—$R^2$; and each occurrence of $R^1$ is independently hydrogen, $C_1$-$C_{12}$ alkyl, $C_1$-$C_{12}$ haloalkyl, $C_1$-$C_{12}$ alkoxy, $C_1$-$C_{12}$ haloalkoxy, aryl, —$C_1$-$C_6$ alkyl-O—$C_1$-$C_6$ alkyl, or —$C_1$-$C_6$ alkyl-O-aryl.

Other exemplary monomers include the class of compounds according to structure (XXIII):

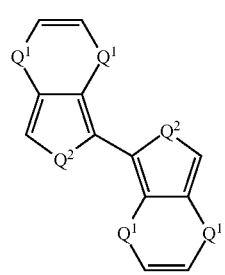
(XXIII)

wherein each occurrence of $Q^2$ is independently S, O, or N—$R^2$ wherein $R^2$ is hydrogen or $C_1$-$C_6$ alkyl; and each occurrence of $Q^1$ is independently S or O.

Exemplary conducting monomers include the class of compounds according to structure (XXIV):

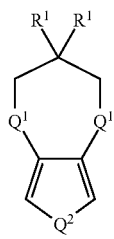

(XXIV)

wherein $Q^2$ is S, O, or N—$R^2$ wherein $R^2$ is hydrogen or $C_1$-$C_6$ alkyl; each occurrence of $Q^1$ is independently S or O; and each occurrence of $R^1$ is independently hydrogen, $C_1$-$C_{12}$ alkyl, $C_1$-$C_{12}$ haloalkyl, $C_1$-$C_{12}$ alkoxy, $C_1$-$C_{12}$ haloalkoxy, aryl, —$C_1$-$C_6$ alkyl-O—$C_1$-$C_6$ alkyl, —$C_1$-$C_6$ alkyl-aryl, —$C_1$-$C_6$ alkyl-O-aryl, or —$C_1$-$C_6$ alkyl-O-aryl. In one embodiment, one $R^1$ is methyl and the other $R^1$ is benzyl, —$C_1$-$C_6$ alkyl-O-phenyl, —$C_1$-$C_6$ alkyl-O-biphenyl, or —$C_1$-$C_6$ alkyl-biphenyl.

Additional conducting monomers include the class of compounds according to structure (XXV):

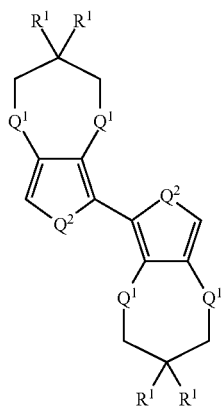

(XXV)

wherein each occurrence of $Q^2$ is independently S, O, or N—$R^2$ wherein $R^2$ is hydrogen or $C_1$-$C_6$ alkyl; each occurrence of $Q^1$ is independently S or O; and each occurrence of $R^1$ is independently hydrogen, $C_1$-$C_{12}$ alkyl, $C_1$-$C_{12}$ haloalkyl, $C_1$-$C_{12}$ alkoxy, $C_1$-$C_{12}$ haloalkoxy, aryl, —$C_1$-$C_6$ alkyl-O—$C_1$-$C_6$ alkyl, or —$C_1$-$C_6$ alkyl-O-aryl. In one embodiment, one $R^1$ is methyl and the other $R^1$ is —$C_1$-$C_6$ alkyl-O-phenyl or —$C_1$-$C_6$ alkyl-O-biphenyl per geminal carbon center.

Other conducting monomers include the class of compounds according to structure (XXVI):

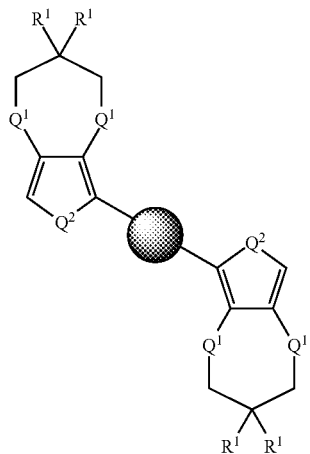

(XXVI)

wherein each occurrence of $Q^2$ is independently S, O, or N—$R^2$ wherein $R^2$ is hydrogen or $C_1$-$C_6$ alkyl; each occurrence of $Q^1$ is independently S or O; each occurrence of $R^1$ is independently hydrogen, $C_1$-$C_{12}$ alkyl, $C_1$-$C_{12}$ haloalkyl, $C_1$-$C_{12}$ alkoxy, $C_1$-$C_{12}$ haloalkoxy, aryl, —$C_1$-$C_6$ alkyl-O—$C_1$-$C_6$ alkyl, or $C_1$-$C_6$ alkyl-O-aryl; and represents an aryl. In one embodiment, one $R^1$ is methyl and the other $R^1$ is —$C_1$-$C_6$ alkyl-O-phenyl or —$C_1$-$C_6$ alkyl-O-biphenyl per geminal carbon center.

Exemplary conducting monomers include the class of compounds according to structure (XXVII):

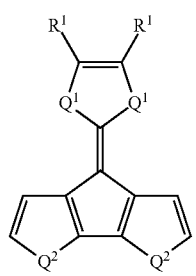

(XXVII)

wherein each occurrence of $Q^2$ is independently S, O, or N—$R^2$ wherein $R^2$ is hydrogen or $C_1$-$C_6$ alkyl; each occurrence of $Q^1$ is independently S or O; and each occurrence of $R^1$ is independently hydrogen, $C_1$-$C_{12}$ alkyl, $C_1$-$C_{12}$ haloalkyl, $C_1$-$C_{12}$ alkoxy, $C_1$-$C_{12}$ haloalkoxy, aryl, —$C_1$-$C_6$ alkyl-O—$C_1$-$C_6$ alkyl, or —$C_1$-$C_6$ alkyl-O-aryl.

Additional conducting monomers include the class of compounds according to structure (XXVIII):

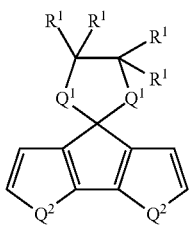

(XXVIII)

wherein each occurrence of $Q^2$ is independently S, O, or N—$R^2$ wherein $R^2$ is hydrogen or $C_1$-$C_6$ alkyl; each occurrence of $Q^1$ is independently S or O; and each occurrence of R is independently hydrogen, $C_1$-$C_{12}$ alkyl, $C_1$-$C_{12}$ haloalkyl, $C_1$-$C_{12}$ alkoxy, $C_1$-$C_{12}$ haloalkoxy, aryl, —$C_1$-$C_6$ alkyl-O—$C_1$-$C_6$ alkyl, or —$C_1$-$C_6$ alkyl-O-aryl.

Another conducting monomer includes aniline or substituted aniline according to structure (XXIX):

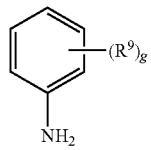

(XXIX)

wherein g is 0, 1, 2, or 3; and each occurrence of $R^9$ is independently $C_1$-$C_{12}$ alkyl, $C_1$-$C_{12}$ haloalkyl, $C_1$-$C_{12}$ alkoxy, $C_1$-$C_{12}$ haloalkoxy, aryl, —$C_1$-$C_6$ alkyl-O—$C_1$-$C_6$ alkyl, —$C_1$-$C_6$ alkyl-O-aryl, or N—$R^2$ wherein $R^2$ is hydrogen or $C_1$-$C_6$ alkyl.

The number average molecular weight ($M_n$) of the conducting polymer can be in the range from about 1,000 to about 40,000, specifically from about 2000 to about 30,000.

The template polymerization may be conducted using a single type of conducting monomer to form a homopolymer, or two or more conducting monomer types in a copolymerization process to form a conducting copolymer. As used herein "conducting polymer" is inclusive of conducting homopolymers and conducting copolymers unless otherwise indicated. Furthermore, in one embodiment, the template polymerization may be conducted with a mixture of conducting monomers and nonconducting monomers as long as the resulting copolymer is conductive.

Compounds are described using standard nomenclature. For example, any position not substituted by any indicated group is understood to have its valency filled by a bond as indicated, or a hydrogen atom. A dash ("-") that is not between two letters or symbols is used to indicate a point of attachment for a substituent. For example, "—CHO" is attached through carbon of the carbonyl group.

Unless otherwise indicated, the term "substituted" as used herein means replacement of one or more hydrogens with one or more substituents. Suitable substituents include, for example, hydroxyl, $C_6$-$C_{12}$ aryl, $C_3$-$C_{20}$ cycloalkyl, $C_1$-$C_{20}$ alkyl, halogen, $C_1$-$C_{20}$ alkoxy, $C_1$-$C_{20}$ alkylthio, $C_1$-$C_{20}$ haloalkyl, $C_6$-$C_{12}$ haloaryl, pyridyl, cyano, thiocyanato, nitro, amino, $C_1$-$C_{12}$ alkylamino, $C_1$-$C_{12}$ aminoalkyl, acyl, sulfoxyl, sulfonyl, amido, or carbamoyl.

As used herein, "alkyl" includes straight chain, branched, and cyclic saturated aliphatic hydrocarbon groups, having the specified number of carbon atoms, generally from 1 to about 20 carbon atoms, greater than 3 for the cyclic. Alkyl groups described herein typically have from 1 to about 20, specifically 3 to about 18, and more specifically about 6 to about 12 carbons atoms. Examples of alkyl include, but are not limited to, methyl, ethyl, n-propyl, isopropyl, n-butyl, 3-methylbutyl, t-butyl, n-pentyl, and sec-pentyl. As used herein, "cycloalkyl" indicates a monocyclic or multicyclic saturated or unsaturated hydrocarbon ring group, having the specified number of carbon atoms, usually from 3 to about 10 ring carbon atoms. Monocyclic cycloalkyl groups typically have from 3 to about 8 carbon ring atoms or from 3 to about 7 carbon ring atoms. Multicyclic cycloalkyl groups may have 2 or 3 fused cycloalkyl rings or contain bridged or caged cycloalkyl groups. Examples of cycloalkyl groups include cyclopropyl, cyclobutyl, cyclopentyl, or cyclohexyl as well as bridged or caged saturated ring groups such as norbornane or adamantane.

As used herein "haloalkyl" indicates both branched and straight-chain alkyl groups having the specified number of carbon atoms, substituted with 1 or more halogen atoms, generally up to the maximum allowable number of halogen atoms ("perhalogenated"). Examples of haloalkyl include, but are not limited to, trifluoromethyl, difluoromethyl, 2-fluoroethyl, and penta-fluoroethyl.

As used herein, "alkoxy" includes an alkyl group as defined above with the indicated number of carbon atoms attached through an oxygen bridge (—O—). Examples of alkoxy include, but are not limited to, methoxy, ethoxy, n-propoxy, i-propoxy, n-butoxy, 2-butoxy, t-butoxy, n-pentoxy, 2-pentoxy, 3-pentoxy, isopentoxy, neopentoxy, n-hexoxy, 2-hexoxy, 3-hexoxy, and 3-methylpentoxy.

"Haloalkoxy" indicates a haloalkyl group as defined above attached through an oxygen bridge.

As used herein, the term "aryl" indicates aromatic groups containing only carbon in the aromatic ring or rings. Such aromatic groups may be further substituted with carbon or non-carbon atoms or groups. Typical aryl groups contain 1 or 2 separate, fused, or pendant rings and from 6 to about 12 ring atoms, without heteroatoms as ring members. Where indicated aryl groups may be substituted. Such substitution may include fusion to a 5 to 7-membered saturated cyclic group that optionally contains 1 or 2 heteroatoms independently chosen from N, O, and S, to form, for example, a 3,4-methylenedioxy-phenyl group. Aryl groups include, for example, phenyl, naphthyl, including 1-naphthyl and 2-naphthyl, and bi-phenyl.

As used herein "heteroaryl" indicates aromatic groups containing carbon and one or more heteroatoms chosen from N, O, and S. Exemplary heteroaryls include oxazole, pyridine, pyrazole, thiophene, furan, isoquinoline, and the like. The heteroaryl groups may be substituted with one or more substituents.

As used herein, "halo" or "halogen" refers to fluoro, chloro, bromo, or iodo.

As used herein, "arylene" includes any divalent aromatic hydrocarbon or two or more aromatic hydrocarbons linked by a bond, a heteroatom (e.g., O, S, S(=O), S(=O)$_2$, etc.), a carbonyl group, an optionally substituted carbon chain, a carbon chain interrupted by a heteroatom, and the like.

Poly(3,4-ethylenedioxythiophene) (PEDOT) is a known conducting polymer exhibiting high conductivity, ranging from $10^{-2}$ to $10^3$ S/cm. As PEDOT is insoluble in many common solvents, it is prepared by template polymerization with a polyanion, such as poly(styrene sulfonic acid) (PSSA). PSSA is a charge-balancing dopant during polymerization in water which allows for the formation of a colloidal dispersion of poly(3,4-ethylenedioxythiophene)-poly(styrenesulfonic acid) or PEDOT-PSS. PEDOT-PSS is commercially available and has desirable properties, such as high stability in the p-doped form, high conductivity, good film formation, and excellent transparency in the doped state. PEDOT-PSS dispersed in water can be spin-coated to result in transparent films.

The template polymer is typically a polyanion, comprising suitable functional groups to be a counterion to the conducting polymer. Suitable functional groups include sulfonic acid, phosphonic acid, and the like, or a combination thereof. The deprotonated sulfuric acid (sulfonate) serves as the negative ion to counterbalance the positive charge carrier on PEDOT.

Other conducting polymers include the conducting polymer-sulfonated poly(imide) complexes and conducting polymer-sulfonated poly(amic acid) complexes described in U.S. Pat. No. 8,753,542B2 to Sotzing which is incorporated by reference herein in its entirety.

The conducting polymer film structure comprises a conducting polymer:template polymer film disposed on the substrate comprising surface nucleophile derivatized nanoparticles. The conducting polymer film structure can be prepared in a variety of ways, many of which has advantages on raw materials cost, processing costs and performance compared with current technologies. For example, the use of open air roll-to-roll (R2R) processing allows for high throughput and low cost compared to techniques to generate optically transparent electrodes that involve sputtering, evaporation, etc. that would require vacuum.

The conducting polymer:template polymer film can be cast onto the surface of the substrate comprising surface nanoparticles from solutions or dispersions comprising the conducting polymer:template polymer and optionally a surfactant in a suitable solvent using techniques known in the art. Suitable solvents for forming a cast film of conducting polymer:template polymer film depends upon the material. The solvent can be an organic solvent or combination of an organic solvent and water, specifically deionized water. Exemplary organic solvents include dichloromethane (DCM), dimethyl sulfoxide (DMSO), toluene, N,N-dimethyl formamide (DMF), propylene glycol monomethyl ether acetate (PGMEA), propylene glycol monomethyl ether (PGME), acetone, methanol, ethanol, tetrahydrofuran (THF), dimethylacetamide (DMAC), ethyl acetate and trifluoroacetic acid.

Suitable casting or coating processes to form the conducting polymer:template polymer film include drop casting, spin coating, ink jetting, spray coating, dip coating, flow coating, dye casting and the like, or a combination thereof. In one embodiment, the conducting polymer:template polymer film substantially covers a portion of the surface of the substrate comprising surface nanoparticles, and specifically covers the entire surface. In another embodiment, the conducting polymer:template polymer film is applied to the surface of the substrate comprising surface nanoparticles in the form of a pattern of any design. Exemplary patterning can be achieved by jetting or a waxing process (wax template), and the like.

After the conducting polymer:template polymer film has been applied to the surface of the substrate comprising surface nanoparticles solvent can be removed, if used, and the film can be annealed. The annealing can be conducted at temperatures of about 80 to about 130° C., specifically about 90 to about 125° C., and yet more specifically about 100 to about 120° C. for as long as needed. Such conditions can be carried out in an oven or other suitable apparatus with or without vacuum or air flow.

The thickness of the conducting polymer:template polymer film can be about to about 40 nm to about 1 micrometer, specifically about to about 80 nm to about 500 nm, and more specifically about 100 nm to about 300 nm.

The conducting polymer film structure has resistivities of about 5 to about 20 ohm/cm$^2$. The conducting polymer film structures can be prepared as optically transparent conducting polymer films for applications such as displays, touchscreens, photovoltaics, resistive heated windows (automotive glass, architectural glass), resistive heated mirrors, see-through displays, as well as printed structures of the conducting polymer on the substrate comprising surface nanoparticles that can be used for transistors, and other circuitry, including other see-through circuitry elements. The conducting polymer film structures can be prepared as optically translucent (light transmitting) conducting polymer films. In another embodiment, the conducting polymer film structures can be prepared as reflective devices where the backplane may be opaque.

A further advantage of these conducting polymer films is that they are suitable for flexible displays. For example, PEDOT-PSS being a polymer, can be flexed like a plastic, and would not generate microcracks as is the case for ITO on PET plastic. Furthermore, if the substrate comprising surface nanoparticles is prepared from an elastomer, then the PEDOT-PSS coated elastomer containing nanoparticles would have the ability to both flex and stretch.

The following illustrative examples are provided to further describe the invention and are not intended to limit the scope of the claimed invention.

EXAMPLES

Example 1

Formation of PET-Silica Films—Spin Coating

This example is directed to one method for the formation of a silica infused insulating polymer film. Materials: polyethyleneterapthalate (PET) as the substrate, trifluoroacetic acid (TFA) and dichloromethane (DCM) as the solvent; and silica (AEROSIL 200) as the nucleophile derivatized nanoparticles. PET is dissolved in TFA:DCM in a 1:1 ratio, and then mixed under high-shear. Silica nanoparticles are then added and dispersed via sonication. The resulting solution is drop cast onto a 1 inch square glass microscope slide. The slide is then spun at the desired rotation per minute (RPM), and then dried in the oven for 1 hour at 110° C.=

Example 2

Formation ofPEDOT:PSS Coating on PET-Silica Film

The substrate prepared in Example 1 containing 3 wt % silica was coated with a conducting layer of CLEVIOS PH100, an aqueous dispersion of poly(3,4-ethylenedioxythiophene)-poly(styrenesulfonate) (PEDOT:PSS ratio 1:2.5 (by weight) and a solid content of 1.0-1.3%) commercially available from Heraeus CLEVIOS GmbH. The PEDOT:PSS was drop cast onto the PET-silica film, spun at the desired RPM, and then annealed in the oven for 1 hour at 110° C. The PET-Silica film was plasma treated for 60 seconds prior to application of PEDOT:PSS. Table 1 reports the sheet resistance and photopic contrast (% T) of the formed films prepared under various spin coating speeds.

All resistances were calculated from an I-V curve at room temperature, with a minimum of 10 data points. Electrical data was obtained using a four line probe fabricated in house according to literature design with grooves carved for the leads ensuring a uniform length and spacing was obtained. [R. K. Hiremath, M. K. Rabinal, B. G. Mulimani, Rev. Sci. Instrum. 2006, 77, 126106.] Current was passed through the outer two electrodes, while the inner two measured voltage. Sheet resistance was calculated based on the relationship $R_s=R(w/l)$ where w is the width of the sample (2.5 cm), and 1 is the distance between the leads (0.35 cm). [Hiremath, 2006] Two current sources were used, a Keithley 224 Programmable for small current (I max=101.1×10-3 A), Power Supply 3630 for high current I max=10 A, and a 196 system DMA was used to measure the voltage.

Contrast is defined as the change in transmittance between the two extreme redox states of an electrochromic material. Often in the literature, contrast is reported at a single-wavelength ($\lambda$max). However, the best representation for reporting contrast is photopic contrast, which consists of a full-spectrum calculation because it is weighted to the sensitivity of the human eye. For best accuracy, the photopic contrast $\Delta T_{photopic}$ is calculated using the transmittance values in the spectral range of 350-850 nm. For both bleached ($T_{photopic,b}$) and colored states ($T_{photopic,c}$), according to the following equation, $$T_{photopic} = \frac{\int_{380}^{780} T(\lambda)S(\lambda)P(\lambda)d\lambda}{\int_{380}^{780} S(\lambda)P(\lambda)d\lambda}$$

and photopic contrast, $$(\Delta T_{photopic}) = \% T_{photopic,b} - \% T_{photopic,c}$$

where $P(\lambda)$ is the normalized spectral response of the human eye, $S(\lambda)$ is the normalized spectral emittance of a blackbody (at 6000 K), and $T(\lambda)$ is the spectral transmittance of the device. A spectrum for each of the two extreme redox states is taken on the film. All spectra were recorded without background correction. The average photopic contrast for each data point has an error bar that is within ±1% T.

TABLE 1

PEDOT:PSS on PET film (3 wt % silica), 60 s plasma treatment

| RPM | Rs (Ω/sq) | PEDOT:PSS Film Thickness (nm) | Photopic Contrast (% T) |
|---|---|---|---|
| 600 | 9 | 300 | 78 |
| 1000 | 18.9 | 276 | 84 |
| 2000 | 40 | 165 | 92 |
| 4000 | 109 | 73 | 95 |
| 8000 | 435 | 51 | 97 |

The results show that PET containing 3 wt % silica nanoparticles as the substrate and PEDOT:PSS as the conducting layer, a low sheet resistance of 9 Ω/sq with a photopic contrast of 78% can be achieved. These preliminary results exhibit lower sheet resistances and higher conductivities than any other reported PEDOT:PSS due to the phase segregation that occurs from the silica nanoparticles and the hydroxyl groups, added from plasma treatment, bonding with the PSS.

Several other substrates have been studied (polyimide, polycarbonate, thermoplastic polyurethane (TPU)) as well as several different conducting polymers (Polyaniline (PANI):PSS, Polypyrrole:PSS, etc.), and all are exhibiting the same trend as seen with the PET/Silica substrates with PEDOT:PSS.

Tables 2 and 3 provide sheet resistance and photopic contrast (% T) of formed films prepared under various spin coating speeds. Table 2 reports the results of a PET film containing 3 wt % silica where the film was not plasma treated, while Table 3 reports the results of a PET film free of silica and no plasma treatment. As shown by the results, higher sheet resistance were reported compared to the films of Table 1.

TABLE 2

PEDOT:PSS on PET film (3 wt % silica), no plasma treatment

| RPM | Rs (Ω/sq) | PEDOT:PSS Film Thickness (nm) | Photopic Contrast (% T) |
|---|---|---|---|
| 600 | | | |
| 1000 | 25 | 267 | 88 |
| 2000 | 60 | 172 | 93 |
| 4000 | 123 | 95 | 98 |

TABLE 3

PEDOT:PSS on PET film (0 wt % silica), no plasma treatment

| RPM | Rs (Ω/sq) | PEDOT:PSS Film Thickness (nm) | Photopic Contrast (% T) |
|---|---|---|---|
| 600 | | | |
| 1000 | 92 | 229 | 88 |
| 2000 | 201 | 147 | 93 |
| 4000 | 747 | 60 | 98 |

Example 3

Formation of PEDOT:PSS Coating on PET-Silica Film

Three solutions containing varying amounts of PEDOT:PSS were prepared using CLEVIOS PH100:

Solution C: 12.5% wt (CLEVIOS PH1000+5% wt DMSO)+87.5% wt DI water

Solution D: 6.25% wt (CLEVIOS PH1000+5% wt DMSO)+93.75% wt DI water

Solution E: CLEVIOS PH1000+5% wt DMSO+1.5% wt surfactant

DI=deionized water; DMSO=dimethyl sulfoxide

PET-Silica films containing 3% or 5% silica content based on the % wt of the PET and prepared according to Example 1 were used as substrates. The PET-Silica films were plasma treated for 20, 40, 60, or 120 seconds prior to application of PEDOT:PSS.

Four methods of forming a PEDOT:PSS film over the PET-Silica films were explored and all resulting films were annealed at 110° C. for 1 hour:

Method A. Drop cast onto PET-Silica film (0.2 ml), dry at room temperature (Solution C&D)

Method B. Drop cast onto PET-Silica film, then spin coat (600 rpm, 60 s) (Solution E)

Method C. Drop cast onto PET-Silica film, wait 30 min, then spin coat (600 rpm, 60 s) (Solution E)

Method D. Spin coat (600 rpm, 60 s, drop during spinning) (Solution E)

The photopic transmittance data obtained for the films were baseline corrected. Photopic T % of glass slide as baseline.

The film thickness varied from piece to piece and rough estimates for the thickness of the films are provided below:

PET-Silica film with 3% wt silica—about 300 nm
PET-Silica film with 5% wt silica—about 500 nm
PEDOT:PSS film—about 300 to about 500 nm
Therefore, the conductivity was calculated using an average PEDOT:PSS film thickness of 400 nm.

The following tables report the sheet resistance and photopic transmittance of the formed films.

TABLE 4

Drop cast, 12.5% wt (PEDOT:PSS + DMSO) solution + 87.5% wt DI water

| | Silica content (% wt of PET) | | | |
|---|---|---|---|---|
| | 3% | | 5% | |
| Plasma treatment time (s) | Sheet resistance (Ω/sq) | Photopic transmittance (%) | Sheet resistance (Ω/sq) | Photopic transmittance (%) |
| 20 s | — | 68.7 | 39 | 68.9 |
| 40 s | — | 68.2 | 14.24 | 73.9 |
| 60 s | 20 | 73.0 | 9.3 | 73.3 |
| 120 s | 21 | 74.4 | 11.7 | 68.7 |

TABLE 5

Drop cast, 6.25% wt (PEDOT:PSS + DMSO) solution + 93.75% wt DI water

| | Silica content (% wt of PET) | | | |
|---|---|---|---|---|
| | 3% | | 5% | |
| Plasma treatment time (s) | Sheet resistance (Ω/sq) | Photopic transmittance (%) | Sheet resistance (Ω/sq) | Photopic transmittance (%) |
| 20 s | 124 | 88.7 | 142.5 | 88.4 |
| 40 s | 93 | 90.1 | 52 | 88.9 |
| 60 s | 37 | 87.6 | — | 80.6 |
| 120 s | 40 | 86.5 | 74 | 77.7 |

TABLE 6

Drop cast, then spin coat

| | Silica content (% wt of PET) | | | |
|---|---|---|---|---|
| | 3% | | 5% | |
| Plasma treatment time (s) | Sheet resistance (Ω/sq) | Photopic transmittance (%) | Sheet resistance (Ω/sq) | Photopic transmittance (%) |
| 20 s | 57.6 | 81.4 | 37 | 78.5 |
| 40 s | 48 | 76.3 | 40 | 80.9 |
| 60 s | 21.7 | 79.9 | 26.6 | 81.7 |
| 120 s | 18.6 | 77.8 | 32 | 78.2 |

TABLE 7

Drop cast, wait 30 minutes, then spin coat

| | Silica content (% wt of PET) | | | |
|---|---|---|---|---|
| | 3% | | 5% | |
| Plasma treatment time (s) | Sheet resistance (Ω/sq) | Photopic transmittance (%) | Sheet resistance (Ω/sq) | Photopic transmittance (%) |
| 20 s | 32 | 73.0 | 20 | 70.5 |
| 40 s | 22 | 73.4 | 11 | 77.4 |
| 60 s | 21.7 | 72.9 | — | 69.0 |
| 120 s | 17 | 73.2 | 16.7 | 75.7 |

TABLE 8

Drop during spinning

| | Silica content (% wt of PET) | | | |
|---|---|---|---|---|
| | 3% | | 5% | |
| Plasma treatment time (s) | Sheet resistance (Ω/sq) | Photopic transmittance (%) | Sheet resistance (Ω/sq) | Photopic transmittance (%) |
| 20 s | 38.4 | 82.1 | 19 | 77.4 |
| 40 s | 21.7 | 81.5 | 17 | 78.9 |
| 60 s | 15.5 | 79.2 | 10.5 | 80.3 |
| 120 s | 16 | 76.9 | 12.4 | 76.1 |

Films formed by Method A show 'coffee rings' which affect the measurement of sheet resistance (Rs). Method B and C show similar results in terms of Rs, however both are better than A. Method D shows a higher average photopic transmittance compared to method C. Generally, films with silica of 5% wt (of PET) show lower Rs compared to films with silica of 3% wt. No obvious difference in photopic T % although by visual inspection more silica particles can be seen in films with silica of 5% wt by eye.

The PEDOT-PSS films that have been generated show behavior of a metal having ohmic behavior, very high electrical conductivities, and a semiconductor to metal transition at or above 0° C. It is surprising that PEDOT-PSS in these films are so conductive and exhibit metallic behavior in view that a metal's resistance increases with temperature due to photon scattering and a semiconductor's resistance decreases with temperature because electrons are excited into higher energy states.

The benefits of the transparent conductive films from nanoparticle induced phase segregation of counterion templates from conducting polymers are comparable or better than known transparent conductive coatings summarized in the table below.

TABLE 9

Examples of transparent conductive coatings

| Material Type | Bulk Resistivity ($\times 10^{-4}$ $\Omega \cdot$ cm) | Surface Resistivity ($\Omega$/sq.) | % Transmission At 550 nm | Work Function | Other |
|---|---|---|---|---|---|
| Indium tin oxide, PET | 7.5 | 100 | 77 | | Up to 75 mm curvature |
| Indium tin oxide, Glass | 1.3 | 10 | 84 | 4.4-4.5 | |
| Aluminum doped zinc oxide (on glass) | 5.0 | 10 | 85 | 5.1 | |
| Fluorine tin oxide (on glass) | 5.0 | 7 | 81 | 4.6 | |
| Silver nanoparticles film (Carestream) | 0.015* | 100 | 88-89 | | High flexibility |
| SWCNT (Linde AG) | | 100 | 98-99 | | High flexibility |
| Metal Mesh (PolyIC) | | 0.4 | 85 | | High flexibility |
| PEDOT/PSS | | 100 to 150 | 90 | 4.8-6.0 | High flexibility |

*Bulk resistivity of silver metal
Source: BCC Research

Example 4

Figure 2:
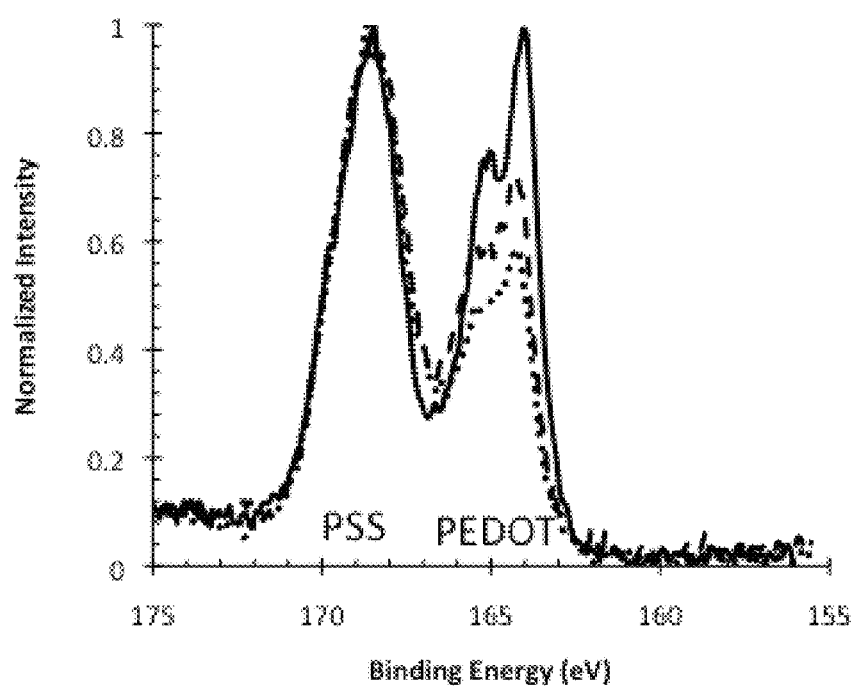
FIG. 2 contains XPS results for PEDOT-PSS films on various substrates containing nucleophile derivatized nanoparticles (silica) compared to a control substrate free of nucleophile derivatized nanoparticles.

Phase Segregation of PEDOT and PSS from the Outer Surface of PEDOT:PSS Films The phenomenon of PEDOT and PSS phase segregation as observed on the outer surface of the PEDOT-PSS films was analyzed by x-ray photoelectron spectroscopy (XPS). FIG. 2 discloses three XPS traces for PEDOT-PSS films on (dotted line) a control sample of electrospun PET fibers of 3 micrometer diameter with 150 nm thick PEDOT-PSS film, (dashed line) PET electrospun mat of same fiber diameter having silica nanoparticles with 150 nm thick film of PEDOT-PSS, and (solid line) PEDOT-PSS film of 130 nm thickness on synthetic leather fibers having silica nanoparticles. As shown in FIG. 2, the two bands between 162 and 166 eV are the spin-split doublet S(2P), S($2p_{1/2}$) and S($2p_{3/2}$), bands from the sulfur in PEDOT. [X. Crispin, S. Marciniak, W. Osikowicz, G. Zotti, A. W. D. van der Gon, F. Louwet, M. Fahlman, L. Groenendaal, F. De Schryver, W. R. Salaneck, *J. Polym. Sci. Part B Polym. Phys.* 2003, 41, 2561; U. Voigt, W. Jaeger, G. H. Findenegg, R. v. Klitzing, *J. Phys. Chem. B* 2003, 107, 5273] The energy splitting is ~1.2 eV, the respective intensities have a ratio of 1:2 and the components typically have the same full width at half maximum and shape. In the case of the sulfur S2p from PSS, the binding energy bands are found at higher energy between 166 and 172 eV. The broad peak is composed of the spin-split doublet peaks. This broadening effect is due to the sulfonate group existing in both the neutral and anionic state. Therefore, there is a broad distribution of different energies in this high molecular weight polymer. The same applies to PEDOT although the number of charged and neutral species are not as large in number. The PEDOT:PSS ratio was calculated by measuring the integral area ratio of peaks assigned to PEDOT and PSS. The ratio of PEDOT to PSS increased from 1 to 1.95 for the control consisting of PET fibers without silica having a coating of PEDOT-PSS to a ratio of 1 to 1.2 for PET fibers containing silica nanoparticles translating to an 80% reduction of PSS at the surface. The PEDOT to PSS ratio of 1 to 1.95 of the control sample consisting of PEDOT-PSS film coated on PET fibers without silica agrees well with the manufacture specifications for the Clevios PH1000 [Coating Guide Clevios™ P Formulations. 1-12 (2012). at http://www.heraeus-clevios.com/media/web-media_local/media/datenblaetter/Clevios_P_coating_guide_08-03-18jb2.pdf] indicating there is no phase segregation in the absence of silica.

These results indicate PEDOT:PSS has undergone phase segregation forming a PEDOT rich surface to the PEDOT-PSS film likely due to hydrogen bonding between the sulfonate anions on PSS and the hydroxyl rich surface of silica. [S.-J. Wang, Y.-J. Choi, S. C. Gong, Y.-H. Kim, H.-H. Park, Mol. Cryst. Liq. Cryst. 2012, 568, 179] The phase segregation was not significant enough to induce high level ordering or crystal growth as the microstructure mostly remained amorphous based on glancing angle X-ray measurements. This could likely be due to PSS as previous reports did not observe PEDOT crystalline formation until it was removed. [Wang, 2012; N. Kim, S. Kee, S. H. Lee, B. H. Lee, Y. H. Kahng, Y.-R. Jo, B.-J. Kim, K. Lee, Adv. Mater. 2014, 26, 2268; D. Alemu, H.-Y. Wei, K.-C. Ho, C.-W. Chu, Energy Environ. Sci. 2012, 5, 9662] Since inter and intra-charge hopping is believed to be the dominant conduction mechanism in conducting polymers [A. Aleshin, R. Kiebooms, R. Menon, A. J. Heeger, *Synth. Met.* 1997, 90, 61] hydrogen bonding interactions leading to phase segregation between PEDOT and PSS enables more interchain interaction between the conducting PEDOT domains. Hence, the energy barrier for charge hopping is lowered leading to better charge transfer among the PEDOT chains. [D. Alemu, H.-Y. Wei, K.-C. Ho, C.-W. Chu, Energy Environ. Sci. 2012, 5, 9662]

The singular forms "a," "an," and "the" include plural referents unless the context clearly dictates otherwise. The endpoints of all ranges directed to the same characteristic or component are independently combinable and inclusive of the recited endpoint.

While the invention has been described in detail in connection with only a limited number of embodiments, it should be readily understood that the invention is not limited to such disclosed embodiments. Rather, the invention can be modified to incorporate any number of variations, alterations, substitutions, or equivalent arrangements not heretofore described, but which are commensurate with the spirit and scope of the invention. Additionally, while various embodiments of the invention have been described, it is to be understood that aspects of the invention can include only some of the described embodiments. Accordingly, the invention is not to be seen as limited by the foregoing description, but is only limited by the scope of the appended claims.

What is claimed is:

1. A conductive polymer film structure, comprising
an insulating substrate comprising nucleophile derivatized nanoparticles located at the surface of the insulating substrate; and
a conducting polymer:template polymer coating disposed on at least a portion of a surface of the insulating substrate through which a chemical bond forms between at least one anion of the template polymer and nucleophile derivatized nanoparticles located at the surface of the insulating substrate.

2. The conductive polymer film structure of claim 1, wherein the insulating substrate is polyacrylic, polyamide, polycarbonate, polyether, polyester, polyethylene, polyimide, polyurethane, polyester-polyurethane copolymer, polyurea, polythiourea, polysiloxane, polyisoprene, polybutadiene, polyethylene oxide, polylactic acid, blends thereof, or copolymers thereof.

3. The conductive polymer film structure of claim 1, wherein the nucleophile derivatized nanoparticles is silicon dioxide ($SiO_2$), titanium dioxide ($TiO_2$), aluminum oxide, calcium oxide, amine functionalized nanoparticles, or a combination thereof.

4. The conductive polymer film structure of claim 1, wherein the nanoparticles have a particle size of about 1 nanometer (nm) to about 1000 nm.

5. The conductive polymer film structure of claim 1, wherein the nanoparticles are present in the insulating substrate in an amount of about 0.05 to about 5 wt % based on the total weight of the insulating substrate.

6. The conductive polymer film structure of claim 1, wherein the insulating substrate has a thickness of about 100 nm to about 5 mm.

7. The conductive polymer film structure of claim 1, wherein the conducting polymer of the conducting polymer:template polymer comprises units of a conducting monomer wherein the conducting monomer is thiophene, substituted thiophene, 3,4-ethylenedioxythiophene, thieno[3,4-b]thiophene, substituted thieno[3,4-b]thiophene, dithieno[3,4-b:3',4'-d]thiophene, thieno[3,4-b]furan, substituted thieno[3,4-b] furan, bithiophene, substituted bithiophene, pyrrole, substituted pyrrole, phenylene, substituted phenylene, naphthalene, substituted naphthalene, biphenyl and terphenyl and their substituted versions, phenylene vinylene, substituted phenylene vinylene, aniline, substituted aniline, a monomer of any one of structures (I)-(XXIX):

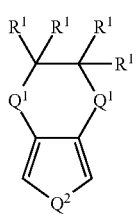
(I)

wherein each occurrence of $Q^1$ is independently S or O; $Q^2$ is S, O, or N—$R^2$ wherein $R^2$ is hydrogen or $C_1$-$C_6$ alkyl; and each occurrence of $R^1$ is independently hydrogen, $C_1$-$C_{12}$ alkyl, $C_1$-$C_{12}$ alkyl-OH, $C_1$-$C_{12}$ haloalkyl, $C_1$-$C_{12}$ alkoxy, $C_1$-$C_{12}$ haloalkoxy, aryl, $C_1$-$C_6$ alkyl-O—$C_1$-$C_6$ alkyl, or $C_1$-$C_6$ alkyl-O-aryl;

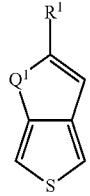
(II)

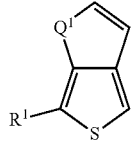
(III)

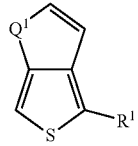
(IV)

wherein $Q^1$ is S, O, or Se; and $R^1$ is hydrogen, $C_1$-$C_{12}$ alkyl, $C_1$-$C_{12}$ haloalkyl including perfluoroalkyl, $C_1$-$C_{12}$ alkoxy, $C_1$-$C_{12}$ haloalkoxy, aryl, —$C_1$-$C_6$ alkyl-O—$C_1$-$C_6$ alkyl, or —$C_1$-$C_6$ alkyl-O-aryl;

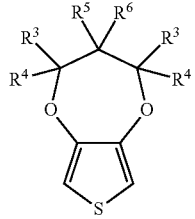
(V)

wherein each instance of $R^3$, $R^4$, $R^5$, and $R^6$ independently is hydrogen; optionally substituted $C_1$-$C_{20}$ alkyl, $C_1$-$C_{20}$ haloalkyl, aryl, $C_1$-$C_{20}$ alkoxy, $C_1$-$C_{20}$ haloalkoxy, aryloxy, —$C_1$-$C_{10}$ alkyl-O—$C_1$-$C_{10}$ alkyl, —$C_1$-$C_{10}$ alkyl-O-aryl, $C_1$-$C_{10}$ alkyl-aryl; or hydroxyl;

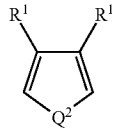
(VI)

wherein $Q^2$ is S, O, or N—$R^2$ wherein $R^2$ is hydrogen or $C_1$-$C_6$ alkyl; and each occurrence of $R^1$ is independently hydrogen, $C_1$-$C_{12}$ alkyl, $C_1$-$C_{12}$ haloalkyl, $C_1$-$C_{12}$ alkoxy, $C_1$-$C_{12}$ haloalkoxy, aryl, —$C_1$-$C_6$ alkyl-O—$C_1$-$C_6$ alkyl, or —$C_1$-$C_6$ alkyl-O-aryl;

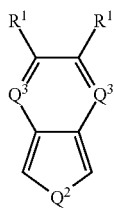
(VII)

wherein $Q^2$ is S, O, or N—$R^2$ wherein $R^2$ is hydrogen or $C_1$-$C_6$ alkyl; each occurrence of $Q^3$ is independently CH or N; and each occurrence of $R^1$ is independently hydrogen, $C_1$-$C_{12}$ alkyl, $C_1$-$C_{12}$ haloalkyl, $C_1$-$C_{12}$ alkoxy, $C_1$-$C_{12}$ haloalkoxy, aryl, —$C_1$-$C_6$ alkyl-O—$C_1$-$C_6$ alkyl, or —$C_1$-$C_6$ alkyl-O-aryl;

(VIII)

wherein $Q^1$ is S or O;

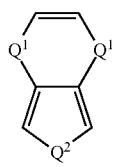
(IX)

wherein $Q^2$ is S, O, or N—$R^2$ wherein $R^2$ is hydrogen or $C_1$-$C_6$ alkyl; and each occurrence of $Q^1$ is independently S or O;

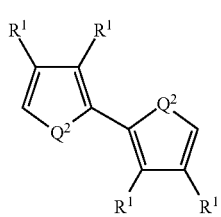
(X)

wherein each occurrence of $Q^2$ is independently S, O, or N—$R^2$ wherein $R^2$ is hydrogen or $C_1$-$C_6$ alkyl; and each occurrence of $R^1$ is independently hydrogen, $C_1$-$C_{12}$ alkyl, $C_1$-$C_{12}$ haloalkyl, $C_1$-$C_{12}$ alkoxy, $C_1$-$C_{12}$ haloalkoxy, aryl, —$C_1$-$C_6$ alkyl-O—$C_1$-$C_6$ alkyl, or —$C_1$-$C_6$ alkyl-O-aryl;

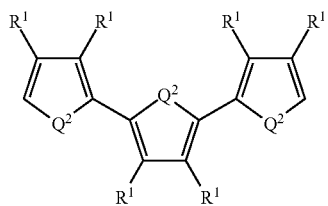
(XI)

wherein each occurrence of $Q^2$ is independently S, O, or N—$R^2$ wherein $R^2$ is hydrogen or $C_1$-$C_6$ alkyl; and each occurrence of $R^1$ is independently hydrogen, $C_1$-$C_{12}$ alkyl, $C_1$-$C_{12}$ haloalkyl, $C_1$-$C_{12}$ alkoxy, $C_1$-$C_{12}$ haloalkoxy, aryl, —$C_1$-$C_6$ alkyl-O—$C_1$-$C_6$ alkyl, or —$C_1$-$C_6$ alkyl-O-aryl;

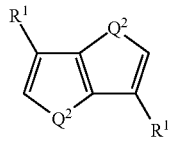
(XII)

wherein each occurrence of $Q^2$ is independently S, O, or N—$R^2$ wherein $R^2$ is hydrogen or $C_1$-$C_6$ alkyl; and each occurrence of $R^1$ is independently hydrogen, $C_1$-$C_{12}$ alkyl, $C_1$-$C_{12}$ haloalkyl, $C_1$-$C_{12}$ alkoxy, $C_1$-$C_{12}$ haloalkoxy, aryl, —$C_1$-$C_6$ alkyl-O—$C_1$-$C_6$ alkyl, or —$C_1$-$C_6$ alkyl-O-aryl;

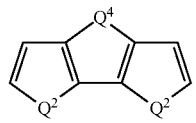
(XIII)

wherein each occurrence of $Q^2$ is independently S, O, or N—$R^2$ wherein $R^2$ is hydrogen or $C_1$-$C_6$ alkyl; $Q^4$ is $C(R^1)_2$, S, O, or N—$R^2$; and each occurrence of $R^1$ is independently hydrogen, $C_1$-$C_{12}$ alkyl, $C_1$-$C_{12}$ haloalkyl, $C_1$-$C_{12}$ alkoxy, $C_1$-$C_{12}$ haloalkoxy, aryl, —$C_1$-$C_6$ alkyl-O—$C_1$-$C_6$ alkyl, or —$C_1$-$C_6$ alkyl-O-aryl;

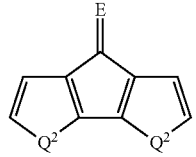
(XIV)

wherein each occurrence of $Q^2$ is independently S, O, or N—$R^2$ wherein $R^2$ is hydrogen or $C_1$-$C_6$ alkyl; and E is O or $C(R^7)_2$, wherein each occurrence of $R^7$ is an electron withdrawing group;

(XV)

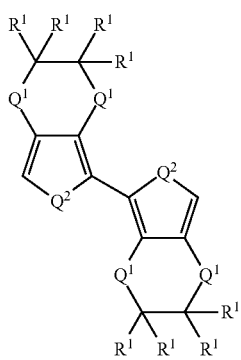

wherein each occurrence of $Q^1$ is independently S or O; each occurrence of $Q^2$ is independently S, O, or N—$R^2$ wherein $R^2$ is hydrogen or $C_1$-$C_6$ alkyl; each occurrence of $R^1$ is independently hydrogen, $C_1$-$C_{12}$ alkyl, $C_1$-$C_{12}$ haloalkyl, $C_1$-$C_{12}$ alkoxy, $C_1$-$C_{12}$ haloalkoxy, aryl, —$C_1$-$C_6$ alkyl-O—$C_1$-$C_6$ alkyl, or —$C_1$-$C_6$ alkyl-O-aryl;

(XVI)

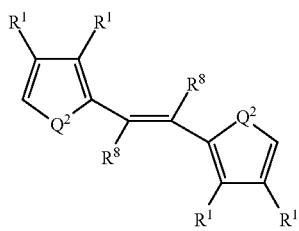

wherein each occurrence of $Q^2$ is independently S, O, or N—$R^2$ wherein $R^2$ is hydrogen or $C_1$-$C_6$ alkyl; each occurrence of $R^1$ is independently hydrogen, $C_1$-$C_{12}$ alkyl, $C_1$-$C_{12}$ haloalkyl, $C_1$-$C_{12}$ alkoxy, $C_1$-$C_{12}$ haloalkoxy, aryl, —$C_1$-$C_6$ alkyl-O—$C_1$-$C_6$ alkyl, or —$C_1$-$C_6$ alkyl-O-aryl; and each occurrence of $R^8$ is hydrogen, $C_1$-$C_6$ alkyl, or cyano;

(XVII)

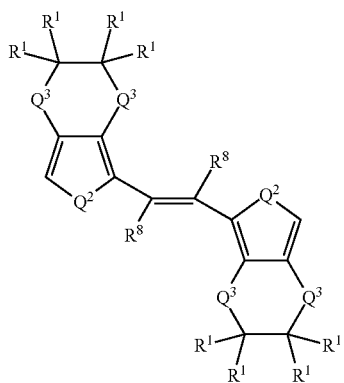

wherein each occurrence of $Q^3$ is independently $CH_2$, S, or O; each occurrence of $Q^2$ is independently S, O, or N—$R^2$ wherein $R^2$ is hydrogen or $C_1$-$C_6$ alkyl; each occurrence of $R^1$ is independently hydrogen, $C_1$-$C_{12}$ alkyl, $C_1$-$C_{12}$ haloalkyl, $C_1$-$C_{12}$ alkoxy, $C_1$-$C_{12}$ haloalkoxy, aryl, —$C_1$-$C_6$ alkyl-O—$C_1$-$C_6$ alkyl, or —$C_1$-$C_6$ alkyl-O-aryl; and each occurrence of $R^8$ is hydrogen, $C_1$-$C_6$ alkyl, or cyano;

(XVIII)

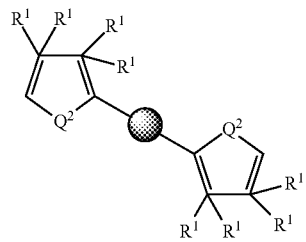

wherein each occurrence of $Q^2$ is independently S, O, or N—$R^2$ wherein $R^2$ is hydrogen or $C_1$-$C_6$ alkyl; each occurrence of $R^1$ is independently hydrogen, $C_1$-$C_{12}$ alkyl, $C_1$-$C_{12}$ haloalkyl, $C_1$-$C_{12}$ alkoxy, $C_1$-$C_{12}$ haloalkoxy, aryl, —$C_1$-$C_6$ alkyl-O—$C_1$-$C_6$ alkyl, or —$C_1$-$C_6$ alkyl-O-aryl; and

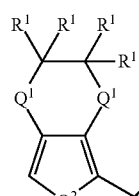

represents an aryl;

(XIX)

wherein each occurrence of $Q^1$ is independently S or O; each occurrence of $Q^2$ is independently S, O, or N—$R^2$ wherein $R^2$ is hydrogen or $C_1$-$C_6$ alkyl; each occurrence of $R^1$ is independently hydrogen, $C_1$-$C_{12}$ alkyl, $C_1$-$C_{12}$ haloalkyl, $C_1$-$C_{12}$ alkoxy, $C_1$-$C_{12}$ haloalkoxy, aryl, —$C_1$-$C_6$ alkyl-O—$C_1$-$C_6$ alkyl, or —$C_1$-$C_6$ alkyl-O-aryl; and represents an aryl;

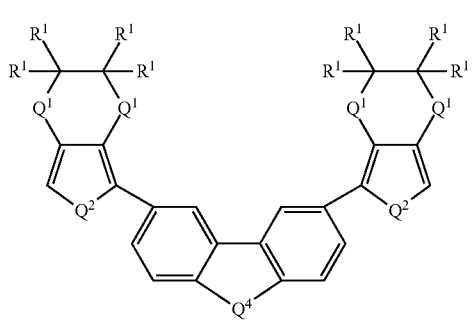
(XX)

wherein each occurrence of $Q^1$ is independently S or O; each occurrence of $Q^2$ is independently S, O, or N—$R^2$ wherein $R^2$ is hydrogen or $C_1$-$C_6$ alkyl; $Q^4$ is $C(R^1)_2$, S, O, or N—$R^2$; and each occurrence of $R^1$ is independently hydrogen, $C_1$-$C_{12}$ alkyl, $C_1$-$C_{12}$ haloalkyl, $C_1$-$C_{12}$ alkoxy, $C_1$-$C_{12}$ haloalkoxy, aryl, —$C_1$-$C_6$ alkyl-O—$C_1$-$C_6$ alkyl, or —$C_1$-$C_6$ alkyl-O-aryl;

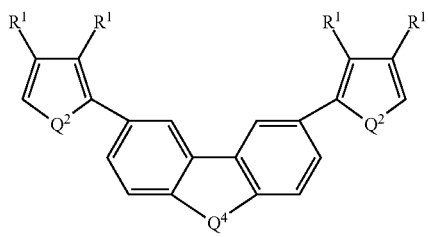
(XXI)

wherein each occurrence of $Q^2$ is independently S, O, or N—$R^2$ wherein $R^2$ is hydrogen or $C_1$-$C_6$ alkyl; $Q^4$ is $C(R^1)_2$, S, O, or N—$R^2$; and each occurrence of $R^1$ is independently hydrogen, $C_1$-$C_{12}$ alkyl, $C_1$-$C_{12}$ haloalkyl, $C_1$-$C_{12}$ alkoxy, $C_1$-$C_{12}$ haloalkoxy, aryl, —$C_1$-$C_6$ alkyl-O—$C_1$-$C_6$ alkyl, or —$C_1$-$C_6$ alkyl-O-aryl;

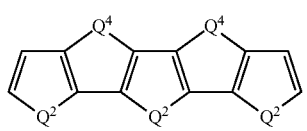
(XXII)

wherein each occurrence of $Q^2$ is independently S, O, or N—$R^2$ wherein $R^2$ is hydrogen or $C_1$-$C_6$ alkyl; each occurrence of $Q^4$ is $C(R^1)_2$, S, O, or N—$R^2$; and each occurrence of $R^1$ is independently hydrogen, $C_1$-$C_{12}$ alkyl, $C_1$-$C_{12}$ haloalkyl, $C_1$-$C_{12}$ alkoxy, $C_1$-$C_{12}$ haloalkoxy, aryl, —$C_1$-$C_6$ alkyl-O—$C_1$-$C_6$ alkyl, or —$C_1$-$C_6$ alkyl-O-aryl;

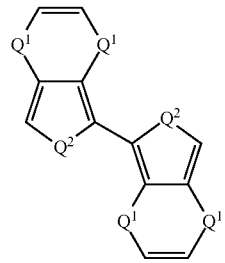
(XXIII)

wherein each occurrence of $Q^2$ is independently S, O, or N—$R^2$ wherein $R^2$ is hydrogen or $C_1$-$C_6$ alkyl; and each occurrence of $Q^1$ is independently S or O;

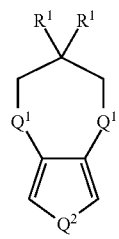
(XXIV)

wherein $Q^2$ is S, O, or N—$R^2$ wherein $R^2$ is hydrogen or $C_1$-$C_6$ alkyl; each occurrence of $Q^1$ is independently S or O; and each occurrence of $R^1$ is independently hydrogen, $C_1$-$C_{12}$ alkyl, $C_1$-$C_{12}$ haloalkyl, $C_1$-$C_{12}$ alkoxy, $C_1$-$C_{12}$ haloalkoxy, aryl, —$C_1$-$C_6$ alkyl-O—$C_1$-$C_6$ alkyl, —$C_1$-$C_6$ alkyl-aryl, —$C_1$-$C_6$ alkyl-O-aryl, or —$C_1$-$C_6$ alkyl-O-aryl;

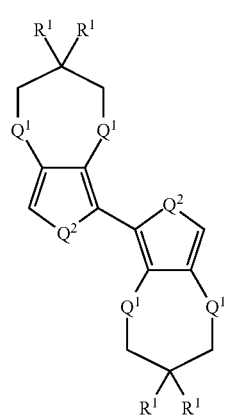
(XXV)

wherein each occurrence of $Q^2$ is independently S, O, or N—$R^2$ wherein $R^2$ is hydrogen or $C_1$-$C_6$ alkyl; each occurrence of $Q^1$ is independently S or O; and each occurrence of $R^1$ is independently hydrogen, $C_1$-$C_{12}$ alkyl, $C_1$-$C_{12}$ haloalkyl, $C_1$-$C_{12}$ alkoxy, $C_1$-$C_{12}$ haloalkoxy, aryl, —$C_1$-$C_6$ alkyl-O—$C_1$-$C_6$ alkyl, or —$C_1$-$C_6$ alkyl-O-aryl;

(XXVI)

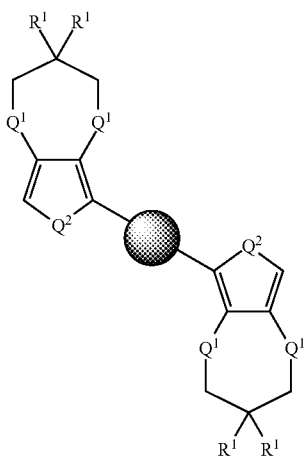

wherein each occurrence of $Q^2$ is independently S, O, or N—$R^2$ wherein $R^2$ is hydrogen or $C_1$-$C_6$ alkyl; each occurrence of $Q^1$ is independently S or O; each occurrence of $R^1$ is independently hydrogen, $C_1$-$C_{12}$ alkyl, $C_1$-$C_{12}$ haloalkyl, $C_1$-$C_{12}$ alkoxy, $C_1$-$C_{12}$ haloalkoxy, aryl, —$C_1$-$C_6$ alkyl-O—$C_1$-$C_6$ alkyl, or —$C_1$-$C_6$ alkyl-O-aryl; and

represents an aryl;

(XXVII)

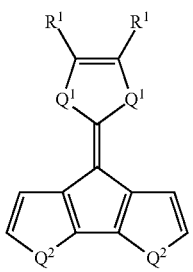

wherein each occurrence of $Q^2$ is independently S, O, or N—$R^2$ wherein $R^2$ is hydrogen or $C_1$-$C_6$ alkyl; each occurrence of $Q^1$ is independently S or O; and each occurrence of $R^1$ is independently hydrogen, $C_1$-$C_{12}$ alkyl, $C_1$-$C_{12}$ haloalkyl, $C_1$-$C_{12}$ alkoxy, $C_1$-$C_{12}$ haloalkoxy, aryl, —$C_1$-$C_6$ alkyl-O—$C_1$-$C_6$ alkyl, or —$C_1$-$C_6$ alkyl-O-aryl;

(XXVIII)

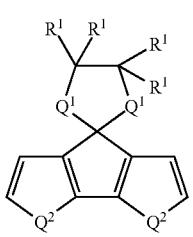

wherein each occurrence of $Q^2$ is independently S, O, or N—$R^2$ wherein $R^2$ is hydrogen or $C_1$-$C_6$ alkyl; each occurrence of $Q^1$ is independently S or O; and each occurrence of $R^1$ is independently hydrogen, $C_1$-$C_{12}$ alkyl, $C_1$-$C_{12}$ haloalkyl, $C_1$-$C_{12}$ alkoxy, $C_1$-$C_{12}$ haloalkoxy, aryl, —$C_1$-$C_6$ alkyl-O—$C_1$-$C_6$ alkyl, or —$C_1$-$C_6$ alkyl-O-aryl;

(XXIX)

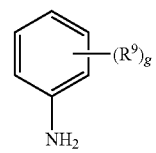

wherein g is 0, 1, 2, or 3; and each occurrence of $R^9$ is independently $C_1$-$C_{12}$ alkyl, $C_1$-$C_{12}$ haloalkyl, $C_1$-$C_{12}$ alkoxy, $C_1$-$C_{12}$ haloalkoxy, aryl, —$C_1$-$C_6$ alkyl-O—$C_1$-$C_6$ alkyl, —$C_1$-$C_6$ alkyl-O-aryl, or N—$R^2$ wherein $R^2$ is hydrogen or $C_1$-$C_6$ alkyl;

or a combination thereof; and the template polymer is a polyanion acting as a counterion for a conducting polymer.

8. The conductive polymer film structure of claim 1, wherein the template polymer comprises sulfonic acid groups, phosphoric acid groups, or a combination thereof.

9. The conductive polymer film structure of claim 1, wherein the conducting polymer:template polymer coating is a film/sheet or a pattern.

10. The conductive polymer film structure of claim 1, wherein the conducting polymer:template polymer coating has a thickness of about 40 nm to about 1 micrometer.

11. The conductive polymer film structure of claim 1, further comprising an additional substrate, wherein the insulating substrate is disposed on a surface of the additional substrate.

12. The conductive polymer film structure of claim 11, wherein the additional substrate is reflective.

13. The conductive polymer film structure of claim 1, having one or more of the following:
photopic transmittance >80%;
sheet resistance of about 5 to about 20 ohm/cm²; and
conductivity greater than 5000 S/cm.

14. The conductive polymer film structure of claim 1, wherein the conducting polymer:template polymer is PEDOT:PSS.

15. An article comprising the conductive polymer film structure of claim 1.

16. The article of claim 15, wherein the article is a display, a touchscreen, a photovoltaic, a resistive heated window, resistive heated mirrors, a see-through display, a transistor, a see-through circuitry element, or a reflective device.

17. A method of making a conductive polymer film structure, comprising
forming a conducting polymer:template polymer coating on at least a portion of a surface of an insulating substrate,
wherein the insulating substrate comprises nanoparticles located at the surface of the insulating substrate,
optionally where the insulating substrate is plasma treated before the forming a conducting polymer:template polymer coating.

18. The method of claim 17, wherein the conducting polymer:template polymer coating is formed using a casting process, tape casting, flow coating, spray coating, spin coating, ink jetting, dip coating, or a combination thereof.

19. An article comprising the conductive polymer film structure prepared by the method of claim 17.

20. The article of claim 19, wherein the article is a display, a touchscreen, a photovoltaic, a resistive heated window, resistive heated mirrors, a see-through display, a transistor, a see-through circuitry element, or a reflective device.

* * * * *